(12) United States Patent
Lee et al.

(10) Patent No.: US 9,264,759 B2
(45) Date of Patent: Feb. 16, 2016

(54) METHOD FOR TRANSMITTING AND RECEIVING BROADCAST SIGNALS, AND BROADCAST RECEPTION DEVICE USING SAID METHOD

(75) Inventors: Hyeonjae Lee, Seoul (KR); Kwansuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 13/510,230

(22) PCT Filed: Nov. 4, 2010

(86) PCT No.: PCT/KR2010/007737
§ 371 (c)(1),
(2), (4) Date: Feb. 12, 2013

(87) PCT Pub. No.: WO2011/062385
PCT Pub. Date: May 26, 2011

(65) Prior Publication Data
US 2013/0139199 A1    May 30, 2013

Related U.S. Application Data

(60) Provisional application No. 61/261,756, filed on Nov. 17, 2009.

(51) Int. Cl.
*G06F 3/00* (2006.01)
*G06F 13/00* (2006.01)
(Continued)

(52) U.S. Cl.
CPC ............. *H04N 21/435* (2013.01); *H04H 60/73* (2013.01); *H04N 21/235* (2013.01); *H04N 21/2362* (2013.01); *H04N 21/4316* (2013.01); *H04N 21/4348* (2013.01); *H04N 21/4622* (2013.01); *H04N 21/4722* (2013.01); *H04N 21/6433* (2013.01); *H04N 21/64322* (2013.01);
(Continued)

(58) Field of Classification Search
USPC ................ 725/40, 51, 60, 109, 112, 113, 136
See application file for complete search history.

(56) References Cited

U.S. PATENT DOCUMENTS 6,240,555 B1 * 5/2001 Shoff ................. H04N 5/44543
348/E5.104
6,505,347 B1 * 1/2003 Kaneko et al. .................. 725/39
(Continued)

FOREIGN PATENT DOCUMENTS

KR    10-2009-0021110 A    2/2009
KR    10-2009-0079838 A    7/2009
(Continued)

*Primary Examiner* — Brian T Pendleton
*Assistant Examiner* — Alexander Gee
(74) *Attorney, Agent, or Firm* — Dentons US LLP

(57) ABSTRACT

Disclosed are a method and device for transmitting and receiving broadcast signals. The disclosed reception method comprises a step for extracting second program table information which indicates the association properties between a plurality of programs, the programs being obtained by using a broadcast stream which comprises at least one program, program table information which indicates the broadcast stream, and at least one broadcast service, from a received broadcast signal. The method further comprises a step for parsing the broadcast stream by using the extracted program table information; and a step for acquiring information about the groups to which the plurality of programs belong by using the extracted second program table information.

13 Claims, 31 Drawing Sheets

(51) Int. Cl.
*H04N 5/445* (2011.01)
*H04N 7/173* (2011.01)
*H04N 7/16* (2011.01)
*H04N 21/435* (2011.01)
*H04H 60/73* (2008.01)
*H04N 21/235* (2011.01)
*H04N 21/2362* (2011.01)
*H04N 21/431* (2011.01)
*H04N 21/434* (2011.01)
*H04N 21/462* (2011.01)
*H04N 21/4722* (2011.01)
*H04N 21/643* (2011.01)
*H04N 21/6433* (2011.01)
*H04N 21/81* (2011.01)
*H04N 21/858* (2011.01)
*H04H 20/10* (2008.01)
*H04H 20/93* (2008.01)

(52) U.S. Cl.
CPC ....... *H04N21/8133* (2013.01); *H04N 21/8586* (2013.01); *H04H 20/106* (2013.01); *H04H 20/93* (2013.01)

(56) References Cited

U.S. PATENT DOCUMENTS

| | | | |
|---|---|---|---|
| 6,700,624 B2* | 3/2004 | Yun | 348/555 |
| 8,099,752 B2* | 1/2012 | Eyer | H04N 21/235 725/40 |
| 2001/0018771 A1* | 8/2001 | Walker | H04N 7/17318 725/91 |
| 2002/0166128 A1* | 11/2002 | Ikeda | H04N 7/163 725/112 |
| 2005/0183133 A1 | 8/2005 | Kelly | |
| 2009/0055866 A1 | 2/2009 | Song et al. | |
| 2009/0055872 A1 | 2/2009 | Kwak et al. | |
| 2009/0172736 A1* | 7/2009 | Tsui et al. | 725/40 |
| 2010/0154000 A1* | 6/2010 | Macrae | H04N 5/44543 725/41 |
| 2012/0030709 A1* | 2/2012 | Gibbon et al. | 725/40 |

FOREIGN PATENT DOCUMENTS

| | | |
|---|---|---|
| WO | 00/24195 A1 | 4/2000 |
| WO | 2008/139317 A2 | 11/2008 |
| WO | 2009/008649 A2 | 1/2009 |

* cited by examiner

FIG.6

| Syntax | Bits | Format |
|---|---|---|
| terrestrial_virtual_channel_table_section () { | | |
|     table_id | 8 | 0xC8 |
|     section_syntax_indicator | 1 | '1' |
|     private_indicator | 1 | '1' |
|     zero | 2 | '00' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0; i<num_channels_in_section;i++) { | | |
|         short_name | 7*16 | unicode™ BMP |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 6 | '111111' |
|         service_type | 6 | uimsbf |
|         source_id | 16 | uimsbf |
|         reserved | 6 | '111111' |
|         descriptors_length | 10 | uimsbf |
|         for (i=0;i<N;i++) { | | |
|             descriptors() | | |
|         } | | |
|     } | | |
|     reserved | 6 | '111111' |
|     additional_descriptors_length | 10 | uimsbf |
|     for(j=0; j<N;j++) { | | |
|         additional_descriptors() | | |
|     } | | |
|     CRC_32 | 32 | rpchof |
| } | | |

FIG.7

| Syntax | Bits | Format |
|---|---|---|
| event_information_table_section () { | | |
|     table_id | 8 | 0xCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     zero | 2 | '00' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j = 0; j< num_events_in_section;j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i=0;i<N;i++) { | | |
|             descriptor() | | |
|         } | | |
|     } | | |
|     CRC_32 | 32 | rpchof |
| } | | |

FIG.8

FIG.11

| Syntax | No. Bits | Format |
|---|---|---|
| Service_map_table_MH_section () { | | |
|     table_id | 8 | 0xBD |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_MH_protocol_version | 8 | uimsbf |
|         ensemble_id | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_MH_services | 8 | uimsbf |
|     for (i=0; i< num_MH_services; i++) | | |
|     { | | |
|         MH_service_id | 16 | uimsbf |
|         multi_ensemble_service | 2 | uimsbf |
|         MH_service_status | 2 | uimsbf |
|         SP_Indicator | 1 | bslbf |
|         short_MH_service_name_length  /* m */ | 3 | uimsbf |
|         short_MH_service_name | 16*m | |
|         reserved | 2 | '11' |
|         MH_service_category | 6 | uimsbf |
|         num_components | 5 | uimsbf |
|         IP_version_flag | 1 | bslbf |
|         source_IP_address_flag | 1 | bslbf |
|         MH_service_destination_IP_address_flag | 1 | bslbf |
|         if (source_IP_addres_flag) | | '11' |
|             source_IP_address | 32 or 128 | uimsbf |
|         if (MH_service_destination_IP_address_flag) | | |
|             MH_service_destination_IP_address | 32 or 128 | uimsbf |

FIG.12

| Syntax | No. Bits | Format |
|---|---|---|
| NRT_information_table_section(){ | | |
|     table_id | 8 | 0xTBD |
|     section_syntax_indicator | 1 | '1' |
|     private_indicator | 1 | '1' |
|     reserved | 2 | '11' |
|     section_length | 12 | uimsbf |
|     service_id | 16 | uimsbf |
|     reserved | 2 | '11' |
|     NRT_IT_version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     time_span_start | 32 | uimsbf |
|     reserved | 5 | '11111' |
|     time_span_length | 11 | uimsbf |
|     num_items_in_section | 8 | uimsbf |
|     for (j=0; j< num_items_in_section; j++) { | | |
|         content_linkage | 32 | uimsbf |
|         updates_available | 1 | bslbf |
|         TF_available | 1 | bslbf |
|         low_latency | 1 | bslbf |
|         content_length_included | 1 | bslbf |
|         playback_length_in_seconds | 20 | uimsbf |
|         if (content_length_included==1){ | | |
|             content_length | 40 | uimsbf |
|         } | | |
|         playback_delay_included | 1 | bslbf |
|         expiration_included | 1 | bslbf |
|         reserved | 2 | '11' |
|         duration | 12 | uimsbf |
|         if (playback_delay_included==1){ | | |
|             reserved | 4 | '1111' |
|             playback_delay | 20 | uimsbf |
|         } | | |
|         if (expiration_included==1){ | | |
|             expiration | 32 | uimsbf |
|         } | | |
|         content_name_length | 8 | uimsbf |
|         content_name_text() | var | |
|         reserved | 4 | '1111' |
|         content_descriptors_length | 12 | uimsbf |
|         for (i=0; i<N; i++) { | | |
|             content_descriptor() | | |
|         } | | |
|     } | | |
|     reserved | 6 | '111111' |
|     descriptors_length | 10 | uimsbf |
|     for (i=0; i<M; i++) { | | |
|         descriptor() | | |
|     } | | |
| } | | |

FIG.13

| | | |
|---|---|---|
| `for (j=0; j<num_components; j++)`<br>`{`<br>    `reserved`<br>    `essential_component_indicator`<br>    `component_destination_IP_address_flag`<br>    `port_num_count`<br>    `component_destination_UDP_port_num`<br>    `if (component_destination_IP_address_flag)`<br>        `component_destination_IP_address`<br><br>    `reserved`<br>    `num_component_level_descriptors`<br>    `for (k=0; k<num_component_level_descriptors; k++)`<br>    `{`<br>        `component_level_descriptor()`<br>    `}`<br>`}`<br>`reserved`<br>`num_MH_service_level_descriptors`<br>`for (m=0; m<num_MH_service_level_descriptors; m++)`<br>`{`<br>    `MH_service_level_descriptor()`<br>`}`<br>`}`<br>`reserved`<br>`num_ensemble_level_descriptors`<br>`for (n=0; n<num_ensemble_level_descriptors; n++)`<br>`{`<br>    `ensemble_level_descriptor()`<br>`}`<br>`}` | <br><br>1<br>1<br>1<br>5<br>16<br><br>32 or 128<br><br><br>4<br>4<br><br><br>var<br><br><br><br>4<br>4<br><br><br>var<br><br><br>4<br>4<br><br><br>var | <br><br>'1'<br>bslbf<br>bslbf<br>uimsbf<br>uimsbf<br><br>uimsbf<br><br><br>'1111'<br>uimsbf<br><br><br><br><br><br>'1111'<br>uimsbf<br><br><br><br><br>'1111'<br>uimsbf<br><br><br> |

FIG.14

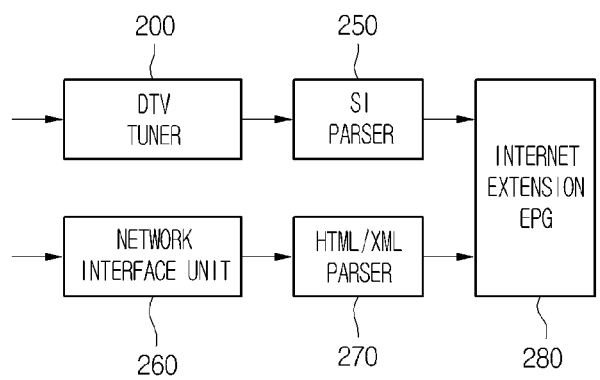

```
Syntax                                    Bits    Format
link_descriptor() {
    descriptor_tag                         8      0xe8
    descriptor_length                      8      uimsbf
    number_of_links                        8      uimsbf
    for (i=0; i<number_of_links; i++) {
        link_type                          8      uimsbf
        link_media                         8      uimsbf
        mime_type_length                   8      uimsbf
        mime_type                          var
        description_length                 8      uimsbf
        description                        var
        link_length                        8      uimsbf
        link_byte                          var
    }
}
```

FIG.22

```
Syntax                                      Bits    Format
ETM_location_extension_descriptor() {
    descriptor_tag                          8       0xe8
    descriptor_length                       8       uimsbf
    ETM_in_PTC_carrying_this_PSIP           1
    ETM_in_PTC_specified_by_the_channel_TSID 1
    ETM_in_NRT_service                      1
    ETM_in_Internet_service                 1
    if (ETM_in_NRT_service =
    {
        mime_type_length                    8       uimsbf
        mime_type                           var
        link_length                         16      '6'
        service_id                          16
        content_id                          32
    }
    if (ETM_in_Internet_service =
    {
        mime_type_length                    8       uimsbf
        mime_type                           var
        link_length                         16
        URL                                 var
    }
}
```

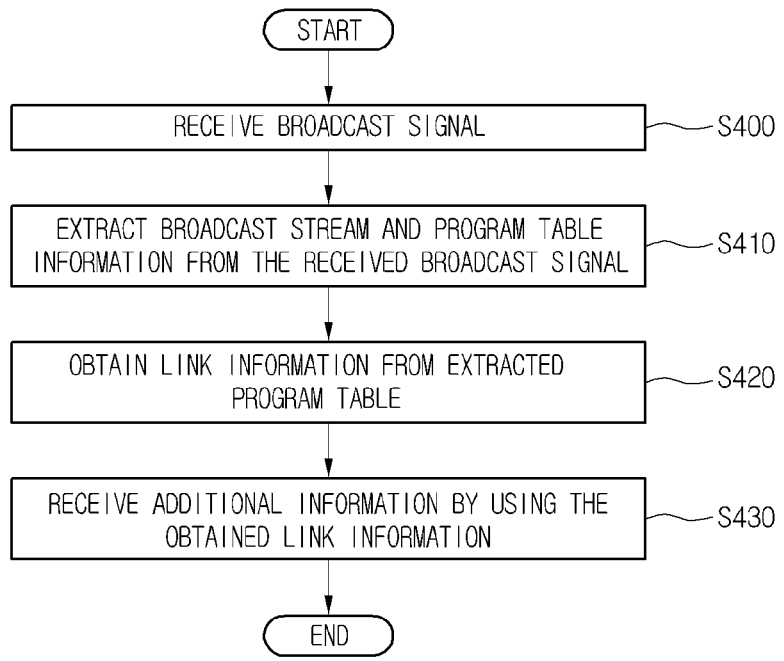

```
Link Descriptor
number_of_links = 2

Link0:
link_type = Highlight
link_media = NRT
mime_type_length = 9
mime_type= "video/avi"
description_length = 20
description = "Radoncic (first half 28 min)"
link_length = 48
link_byte = service:0x0000 content=0x00000003

Link1:
link_type = Highlight
link_media = NRT
mime_type_length = 9
mime_type= "video/avi"
description_length = 20
description = "Thiago (second half 28 min)"
link_length = 48
link_byte = service:0x0000 content=0x00000004
```

FIG.33

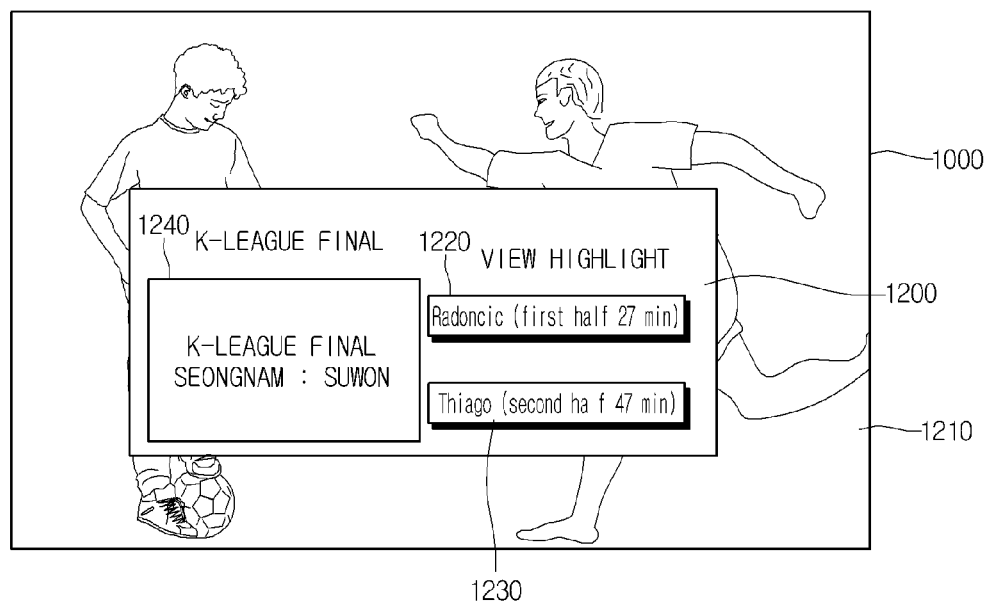

FIG.38

```
Link Descriptor
number_of_links = 2

Link0:
link_type = Mutiview
link_media = Internet
mime_type_length = 9
mime_type= "video/avi"
description_length = 9
description ="Racer #10"
link_length = 24
link_byte = www.racing.com/racer.avi Link1:
link_type = Mutiview
link_media = Internet
mime_type_length = 9
mime_type= "video/avi"
description_length = 18
description = "finish Line"
link_length = 25
link_byte = www.racing.com/finish.avi
```

FIG.39

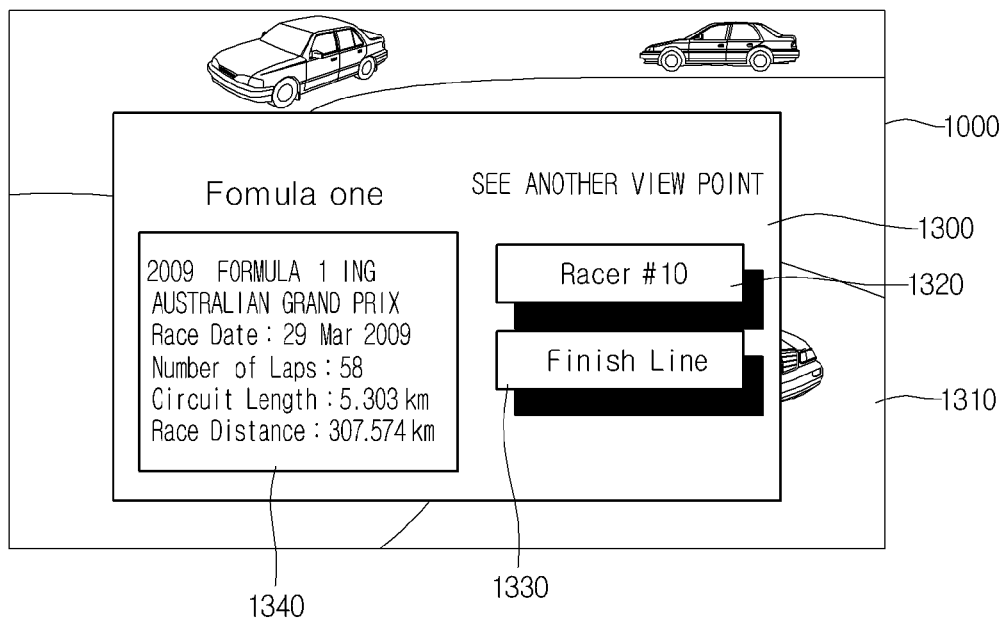

METHOD FOR TRANSMITTING AND RECEIVING BROADCAST SIGNALS, AND BROADCAST RECEPTION DEVICE USING SAID METHOD

This application claims the benefit of priority of PCT Application No. PCT/KR2010/007737 filed on Nov. 4, 2010 which claims the benefit of priority of U.S. Provisional Application No. 61/261,756 filed on Nov. 17, 2009, all of which are incorporated by reference in their entirety herein.

TECHNICAL FIELD

The present disclosure relates to a method and device for transceiving a broadcast signal.

BACKGROUND ART

A digital TV may provide various additional services in addition to its original function such as its video and audio, and for example, a user may select a desired program through metadata representing program broadcasting airtime.

In the case of Advanced Television System Committee (ATSC) digital broadcasting, program information is delivered using the Program and System Information Protocol (PSIP) standard, and the digital TV interprets the delivered program information and displays an Electronic Program Guide (EPG) on the screen for user's easy selection.

Moreover, a digital TV service using a wire/wireless communication network is extensively used. The digital TV service provides various services, which may not be provided from a related art analog broadcast service.

For example, in the case of Internet Protocol Television (IPTV) service, i.e., one type of the digital TV service, a user may actively select type and viewing time of a program through bi-directional service. The IPTV service may provide various additional services such as internet search, home shopping, and online game on the basis of such a bi-directional service.

DISCLOSURE OF THE INVENTION

Technical Problem

Embodiments provide a method and device of transceiving a broadcast signal, which efficiently deliver additional information on broadcast channels or programs.

Technical Solution

In one embodiment, a method of transmitting a broadcast signal includes: generating a broadcast stream including at least one program, program table information representing the broadcast stream, and additional information on the broadcast stream; constituting a stream including the broadcast stream and the program table information; and transmitting the constituted stream and the generated additional information, respectively, wherein the program table information includes link information for linking the broadcast stream with the additional information.

In another embodiment, a method of receiving a broadcast signal includes: extracting a broadcast stream including at least one program and program table information representing the broadcast stream, from the broadcast signal; obtaining link information for linking to additional information on a channel or program in the broadcast stream, from the extracted program table information; and receiving the additional information by using the obtained link information, wherein the additional information is received using at least one of NRT service and Internet service.

In further another embodiment, a device for receiving a broadcast signal includes: a receiver for receiving the broadcast signal; a demodulator for demodulating the received broadcast signal; a demultiplexer for extracting a broadcast stream including at least one program and program table information representing the broadcast stream, from the demodulated broadcast signal; a controller for obtaining link information for linking to additional information on a channel or program in the broadcast stream by using the extracted program table information; and a network interface unit for receiving the additional information through an access to an Internet service corresponding to the obtained link information.

In still further another embodiment, a method of receiving a broadcast signal includes: extracting a broadcast stream including at least one program and program table information representing the broadcast stream, from the broadcast signal; obtaining link information from the extracted program table information; receiving additional information on a channel or program in the broadcast stream by using an NRT service or Internet service corresponding to the link information; and displaying the received additional information.

Advantageous Effects

According to an embodiment, various types of additional information such as pictures or movies in addition to texts may be efficiently provided by transceiving additional information on broadcast channels or programs through a transmission medium such as non-real-time service or Internet service and constituting link information for a link to the additional information.

Moreover, a user interface environment for easily selecting and playing various kinds of additional information may be provided by using the link information.

BRIEF DESCRIPTION OF THE DRAWINGS

FIG. 6 is a view illustrating a syntax structure of a Virtual Channel Table (VCT) shown in FIG. 5 according to an embodiment.

FIG. 7 is a view illustrating a syntax structure of an Event Information Table (EIT) shown in FIG. 5 according to an embodiment.

FIG. 8 is a view illustrating a data allocation method of a broadcast channel according to an embodiment.

FIGS. 11 and 12 are views illustrating a syntax structure of a Service Map Table (SMT) shown in FIG. 10.

FIG. 13 is a view illustrating a syntax structure of a Non-Real-Time Information Table (NRT IT) shown in FIG. 10 according to an embodiment.

FIG. 14 is a block diagram illustrating a method of providing an extended EPG through Internet service.

FIG. 22 is a view illustrating a syntax structure of an Extended Text Message (ETM) location descriptor including link information according to an embodiment.

FIG. 23 is a block diagram illustrating a method of receiving a broadcast signal according to a first embodiment.

FIGS. 28 to 45 are views illustrating a method of displaying on a screen additional information received using link information according to an embodiment.

MODE FOR CARRYING OUT THE INVENTION

Figure 1:
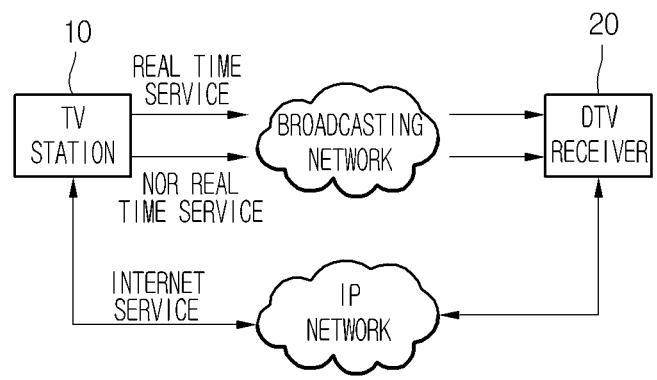
FIG. 1 is a conceptual view illustrating a broadcasting service according to an embodiment.

FIG. 1 is a conceptual view illustrating a broadcasting service according to an embodiment.

Referring to FIG. 1, a TV station 10 may provide Real-Time (RT) service and Non-Real-Time (NRT) service to a DTV receiver 20 via a network.

For example, the TV station 10 generates a broadcast signal for Real Time (RT) service according to the Advanced Television Systems Committee (ATSC) adaptive digital broadcasting standard, and then transmit it to the DTV receiver 20 via a broadcasting network. However, the RT service according to the present invention is not limited to the ATSC standard, and may be transmitted and received through various broadcasting communication standards.

The Non Real Time (NRT) service is a streaming service with which video and audio contents are streamed from the TV station 10 to the DTV receiver 20 at a slower speed or a faster speed (or a combination speed thereof) than an RT speed, and may perform an NRT transmitting, storing, or viewing operation, not an RT streaming operation.

The TV station 10 may transmit the RT service or the NRT service via the same or different channel, and for example, may transmit the RT service, and then, transmit the NRT service using a remaining bandwidth after the RT service transmission or an exclusive bandwidth.

Through the NRT service, the TV station 10 may provide a service including various contents such as news clip, weather information, Video On Demand (VOD), or targeted advertising.

According to an embodiment, the TV station 10 may transmit additional information on broadcast channels or programs through the NRT service, and also may provide various file-based additional information such as pictures, movies, or HTML pages through the NRT service.

In addition, content data transmitted at a lower or faster speed than RT by using the NRT service may be stored in a high capacity storage device (not shown) equipped in the DTV receiver 20 in order to provide them to a user later.

According to an embodiment, the NRT service may be provided in addition to the RT service according to the ATSC adaptive digital broadcasting standard, but the present invention is not limited thereto.

Additionally, the TV station 10 may provide various Internet services such as VOD, news clip, weather information, or targeted advertising to the DTV receiver 20 via an IP network such as internet, and may provide bi-directional communication between the TV station 10 and the DTV receiver 20 via the IP network.

For this, the IP network may include an IP service server (not shown) for providing the Internet service, and the IP service server (not shown) may transceive data with a third party server to provide additional services or advertising links.

According to an embodiment, the TV station 10 may transmit additional information on broadcast channels or programs through the Internet service, and also may provide various file-based additional information such as pictures, movies, or HTML pages through the Internet service.

Although the broadcasting service according to an embodiment was described with reference to FIG. 1, the present invention is not limited thereto. For example, the above mentioned RT service, NRT service, and Internet service may be provided from at least two TV stations, and may be transmitted to the DTV receiver 20 via at least two different networks.

Additionally, the TV station 10 may not provide at least one of the above mentioned RT service, NRT service, and Internet service, and may provide another type of additional services besides that.

According to an embodiment, in addition to additional information provided through the NRT service or Internet service, metadata or a descriptor representing link information for linking the additional information to a corresponding channel or programs may be defined.

Figure 2:
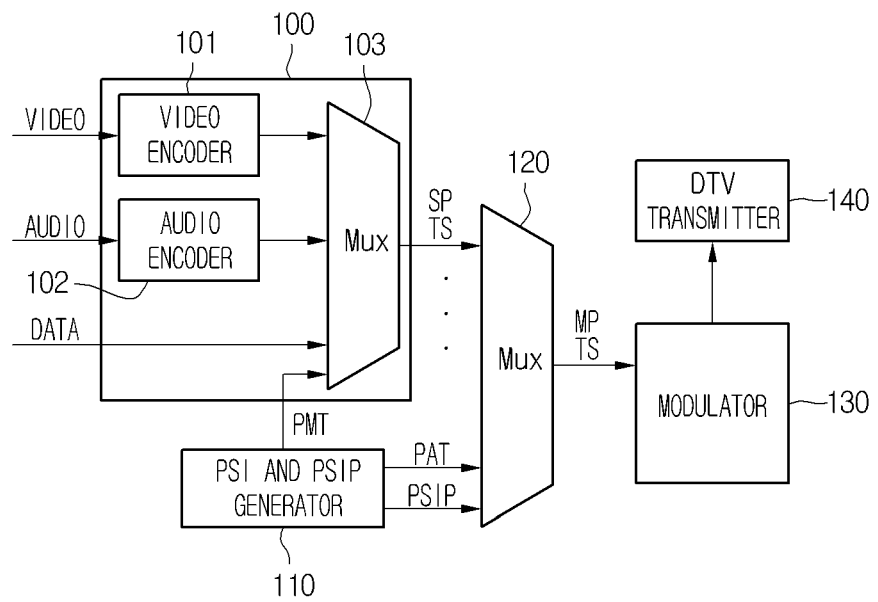
FIG. 2 is a block diagram illustrating a configuration of a broadcast transmitting device according to an embodiment.

FIG. 2 is a block diagram illustrating a configuration of a broadcast transmitting device. The broadcast transmitting device may include a program encoder 100, a PSI and PSIP generator 110, a transport multiplexer 120, a modulator 130, and a DTV transmitter 140.

Referring to FIG. 2, the program encoder 100 may include a video encoder 101, an audio encoder 102, and a SP transport multiplexer 103, and may output a single program transport stream (SP TS) corresponding to one program.

The video encoder 101 receives a video signal of a corresponding program and encodes the video signal through a specific compression, for example, an MPEG-2 compression algorithm, and then outputs the encoded video signal to the SP transport multiplexer 103.

Furthermore, the audio encoder 102 encodes an audio signal of the program by using a specific compression, for example, an AC-3 compression algorithm, and then outputs the encoded audio signal to the SP transport multiplexer 103.

The SP transport multiplexer 103 multiplexes video data encoded by the video encoder 101, audio data encoded by the audio encoder 102, information on a corresponding program, and related data to generate a SP TS.

The PSI and PSIP generator 110 may generate program information including Program Specific Information (PSI) and a Program and System Information Protocol (PSIP).

The PSI may include a Program Association Table (PAT), a Program Map Table (PMT), a Network Information Table (NIT), and a Conditional Access Table (CAT). The PSIP may include a System Time Table (STT), a Master Guide Table (MGT), a Virtual Channel Table (VCT), a Rating Region Table (RRT), an Event Information Table (EIT), and an Extended Text Table (ETT).

The PSI and PSIP generator 110 may further generate information on contents provided through the NRT service or information on contents provided through the Internet service.

For example, the PSI and PSIP generator 110 may output a PMT among the generated tables to the ST transport multiplexer 103, and may output the PAT and PSIP data to the transport multiplexer 120.

Tables generated by the PSI and PSIP generator 110 may have a configuration according to the ATSC adaptive digital broadcasting standard, and this will be described in detail below.

Moreover, the broadcast transmitting device according to an embodiment may include a plurality of program encoders 100, and a plurality of SP TSs.

The SP transport multiplexer 120 multiplexes the SP TSs inputted from the plurality of program encoders 100 and program information inputted from the PSI and PSIP generator 110, for example, the PAT and PSIP data, to generate a Multi Program (MP) TS.

The modulator 130 modulates the MP TS inputted from the transport multiplexer 120, and outputs it. For example, the modulation method may use an 8-Vestigial Side Band (VSB) according to the ATSC standard. Moreover, the broadcast transmitting device may further include a channel coder.

The DTV transmitter 140 transmits the MP TS outputted from the modulator 130 through a specific frequency band. For example, the DTV transmitter 140 may transmit the MP TS through a 6 MHz RF channel.

The configuration of the broadcast transmitting device according to an embodiment is described with reference to FIG. 2, but the present invention is not limited thereto. Therefore, at least one of components shown in FIG. 2 may be omitted, or an additional component may be further included, if necessary.

For example, moreover, the broadcast transmitting device may further include components for transmitting a broadcast signal through the NRT service or Internet service.

Figure 3:
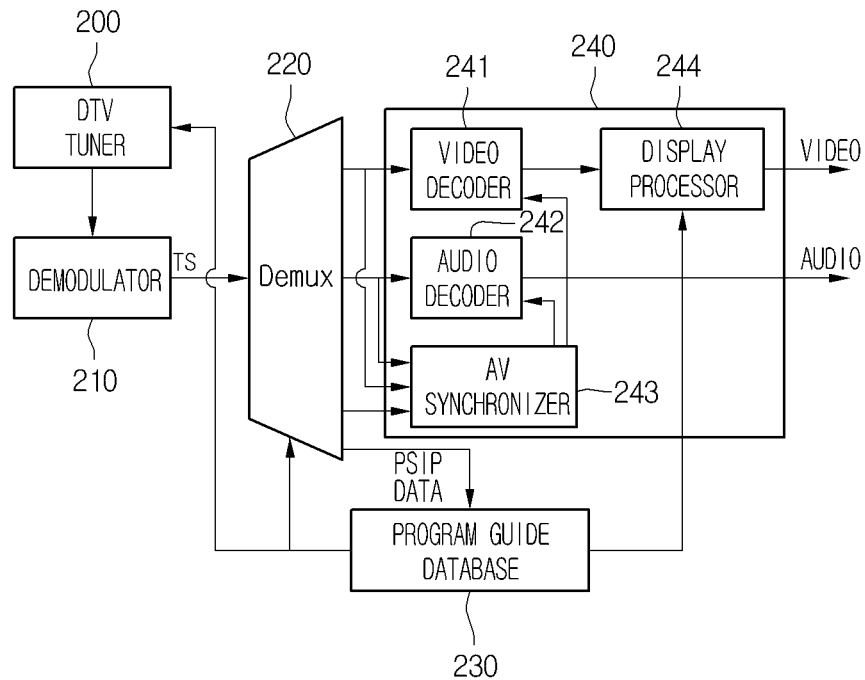
FIG. 3 is a block diagram illustrating a configuration of a broadcast receiving device according to an embodiment.

FIG. 3 is a block diagram illustrating a configuration of a broadcast receiving device. The broadcasting receiving device may obtain a video signal and an audio signal from a broadcast signal received from an external by inversely performing the operations of the broadcast transmitting device described with reference to FIG. 2.

Referring to FIG. 3, the DTV tuner 200 may down-convert a broadcast signal received via a frequency of a specific physical transport channel through an antenna or cable into an Intermediate Frequency (IF) corresponding to a channel that a user selects, and then, may output the down-converted broadcast signal to a demodulator 210.

The demodulator 210 may demodulate a signal outputted from a tuner through a specific modulation, for example, the 8-VSB modulation, and then may output a TS of an actual bit string.

A demultiplexer 220 may demultiplex the TS inputted from the demodulator 210 to extract video stream and audio stream, and for example, may demultiplex the TS into an MEPG-2 bit stream and AC-3 bit stream.

The demultiplexer 220 may separate program information such as the PSI and PSIP from the TS in order to extract it.

Furthermore, the demultiplexer 220 may output the extracted program information, for example, PSIP data, to the program guide database 230.

Moreover, the TS may further include information on contents received through the NRT service or Internet service, and accordingly, the demultiplexer 220 may extract the content information from the TS.

A program decoder 240 may decode the video stream and audio stream inputted from the demultiplexer 220 to output video and audio signals in a playback available format, and for this, may further include a video decoder 241, an audio decoder 242, and an AV synchronizer 243, and a display processor 244.

The video decoder 241 decodes a video stream inputted from the demultiplexer 220 through a specific compression, for example, an MPEG-2 compression algorithm, and then outputs the decoded video stream to the display processor 244. Then, the display processor 244 may convert the inputted video signal into displayable various formats for output.

Moreover, the audio decoder 242 may decode the inputted audio stream through a specific compression, for example, an AC-3 compression algorithm, and then, may output the decoded audio stream.

The AV synchronizer may synchronize the video signal with the audio signal, which are decoded by the video decoder 241 and the audio decoder 242, respectively, by using PCR's from the demultiplexer 220 and time stamps from the video stream.

The configuration of the broadcast receiving device according to an embodiment is described with reference to FIG. 3, but the present invention is not limited thereto. Therefore, at least one of components shown in FIG. 3 may be omitted, or an additional component may be further included, if necessary.

For example, moreover, the broadcast receiving device may further include components for receiving a broadcast signal through the NRT service or Internet service and processing the received broadcast signal.

In more detail, the broadcast receiving device may further include a network interface unit (not shown) for receiving contents through Internet service, a display unit (not shown) for playing a video signal outputted from the program decoder 240, or an audio outputting unit (not shown) for outputting the audio signal.

Hereinafter, a method and device of transmitting a broadcast signal will be described in detail with reference to FIGS. 4 to 22 according to an embodiment.

Figure 4:
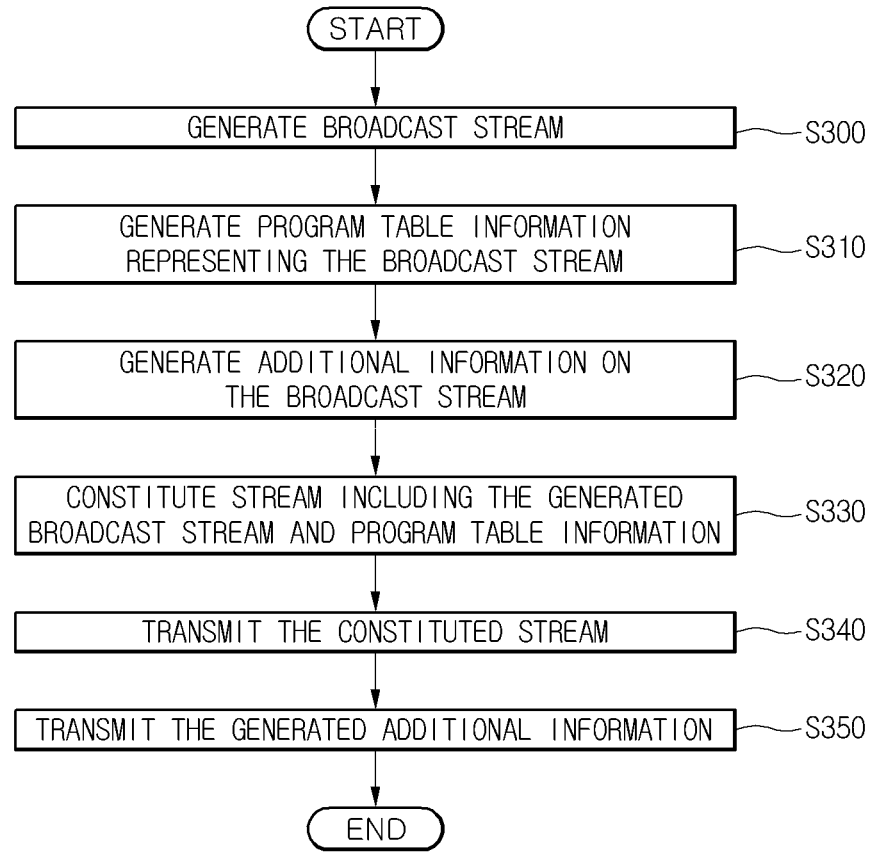
FIG. 4 is a flowchart illustrating a broadcast signal transmitting method according to an embodiment.

FIG. 4 is a flowchart illustrating a method of transmitting a broadcast signal according to an embodiment, and overlapping contents described with reference to FIGS. 1 to 3 will be omitted.

Referring to FIG. 4, a broadcast transmitting device generates a broadcast stream in operation 5300, and generates program table information representing the broadcast stream in operation 5310.

For example, the program encoder 100 in FIG. 2, in more detail, the video encoder 101 and the audio encoder 102, may generate and output a broadcast stream including video data and audio data.

The program table information may include tables according to PSI or PSIP generated by the PSI and PSIP generator 110, and an embodiment relating to the program table information on RT content, i.e., a program provided through RT service, will be described in detail with reference to FIGS. 5 to 7.

Additionally, the program table information may include information on NRT content, i.e., a program provided through NRT service, and its embodiment will be described in detail with reference to FIGS. 9 to 13.

Additionally, the program table information may further include information on internet content, i.e., a program provided through Internet service.

Then, the broadcast transmitting device generates additional information on the broadcast stream in operation S320.

For example, the additional information on the broadcast stream may be additional information on broadcast channels or programs provided through RT service, and in more detail, may be represented with various formats such as pictures, movies, or HTML pages in addition to texts.

In more detail, the additional information may include a thumbnail image, a background screen, an HTML portal, a preview video, an EPG, a highlight video, and a multi-view video, which relate to a corresponding TV station, a broadcast channel, or a program.

Additionally, the program table information may be generated in the PSI and PSIP generator 110 of the broadcast transmitting device of FIG. 2.

The broadcast transmitting device constitutes a stream including the generated broadcast stream and program table information in operation 5330, and then transmits the constituted stream in operation 5340.

For example, the transport multiplexer 120 of the broadcast transmitting device of FIG. 2 may multiplex the generated broadcast stream and second program table information in order to generate a TS. Then, the generated TS may be transmitted through the DTV transmitter 140 after passing through the modulator 130.

Then, the broadcast transmitting device transmits the generated additional information in operation 5350.

The TS including the broadcast stream and program table information and the additional information may be transmitted separately, or transmitted using different transmission methods.

For example, the TS is transmitted using RT service, and the additional information may be transmitted in a file format by using at least one of NRT service and Internet service.

As the TS and the additional information are separately transmitted, link information for linking the broadcast channel or program to additional information thereof may be defined.

According to an embodiment, the program table information in the TS may include link information for linking the broadcast channel or program in the broadcast stream to additional information thereof may be defined.

Accordingly, the link information for linking to the additional information is included in the program table information, and then is transmitted to a broadcast receiving device by using the TS.

Figure 5:
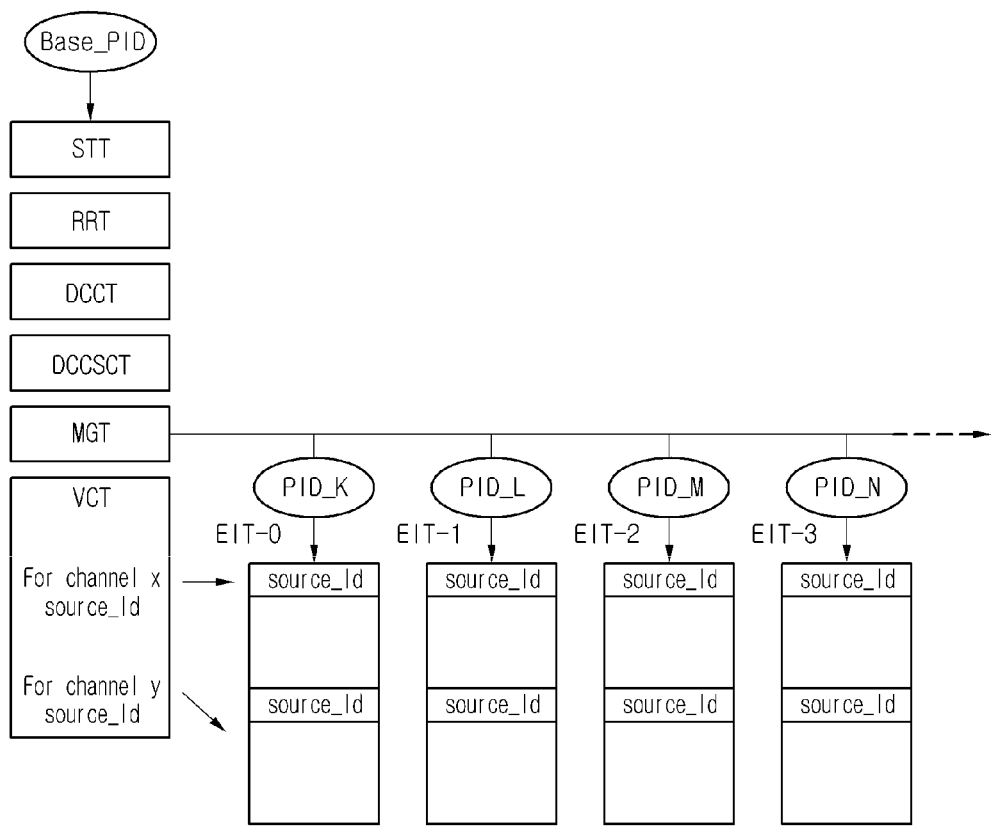
FIG. 5 is a view illustrating a configuration of program table information for RT service according to an embodiment.

FIGS. 5 to 7 are views illustrating tables including information on RT content, which is used for describing an embodiment relating to a configuration of the program table information.

Table 1 represents tables defined using the PSIP according to the ATSC digital broadcast standard.

TABLE 1

| Table | Role |
| --- | --- |
| MGT | Provide version number, size, and PID with respect to other tables |
| VCT | Provide attributes of virtual channels |
| EIT | Provide information on events of virtual channels |

TABLE 1-continued

| Table | Role |
| --- | --- |
| ETT | Provide detailed information on virtual channels and events |
| RRT | Provide rating information on a plurality of areas |
| STT | Provide date and time |

Referring to Table 1 and FIG. 5, the STT may provide information on current date and time and thus, may include time information necessary for application that requires synchronization.

Additionally, the RRT may provide rating information, and may define effective rating tables with respect to different regions or nations.

The MGT is a pointer for other PSIP tables, and may define a size, PID, and version number for each table.

For example, whether tables are modified may be confirmed by using the version number and PID of each table in the MGT whose Base-PID is 0xFFB, and accordingly, the modified table may be received.

Furthermore, the VCT may represent virtual channel information necessary for channel navigation and tuning, and may include two versions such as a Terrestrial Virtual Channel Table (TVCT) for terrestrial broadcasting and a Cable Virtual Channel Table (CVCT) for cable broadcasting.

For example, the VCT may include as basic information a TS ID, a channel number, a short channel name, a program number, an access controller flag, a location field for Extended Text Message (ETM), and a service type, and may consist of syntax as shown in FIG. 6.

In more detail, a broadcast channel defined in the ATSC standard may include a plurality of virtual channels in the VCT consisting of syntax as shown in FIG. 6. Accordingly, the broadcast receiving device may recognize a virtual channel in a corresponding broadcast channel when receiving the VCT. Additionally, the virtual channels are respectively separated channels, and may have different source_id for channel identification.

The EIT includes information on events (i.e., programs) for the virtual channels in the VCT, and may consist of syntax as shown in FIG. 7.

Additionally, the EIT may classify the events according to each channel by using source_id in the VCT.

Additionally, the EIT may consist of 128 tables, i.e., from EIT-0 to EIT 127 corresponding to current events, each having information on programs in a corresponding time interval of every three hours.

The ETT may include relatively long text messages for the events and virtual channels. For example, each of the VCT and EIT may include one ETT, or may not include the ETT at all.

The Directed Channel Change Table (DCCT) provides definitions for modification requests of virtual channels, and the Directed Channel Change Selection Code Table (DCCSCT) provides extension for a basic genre category and location code. The two tables DCCT and DCCSCT may be selective.

FIG. 8 is a view illustrating a data allocation method of a broadcast channel according to an embodiment.

Referring to FIG. 8, a broadcast channel according to the ATSC standard is modulated through a VSB method of a 6 Mhz band, and a bandwidth of data carried on the modulating wave may be about 19.3 Mps. Moreover, the broadcast channel stream may occupy a bandwidth of about 12 Mbps to about 13 Mbps, and accordingly, 6 Mps to 7 Mps in the 19.3 Mps may be transmitted as a null packet coded with 0.

The null packet, not a payload, may be used for accurately delivering a system timer value to a section data area.

Furthermore, the null packet area of 6 Mps to 7 Mps may be used for transmitting another data in addition to a broadcast channel stream.

According to an embodiment, NRT content data provided through the NRT service may be transmitted using the remaining bandwidth of 6 Mps to 7 Mps, and for this, a Digital Storage Media-Command & Control (DSM-CC) protocol and a File Delivery over Unidirectional Transport (FLUTE) method may be used.

FIGS. 9 to 13 are views illustrating tables including the information on NRT content, which is used for describing another embodiment relating to a configuration of the program table information.

Figure 9:
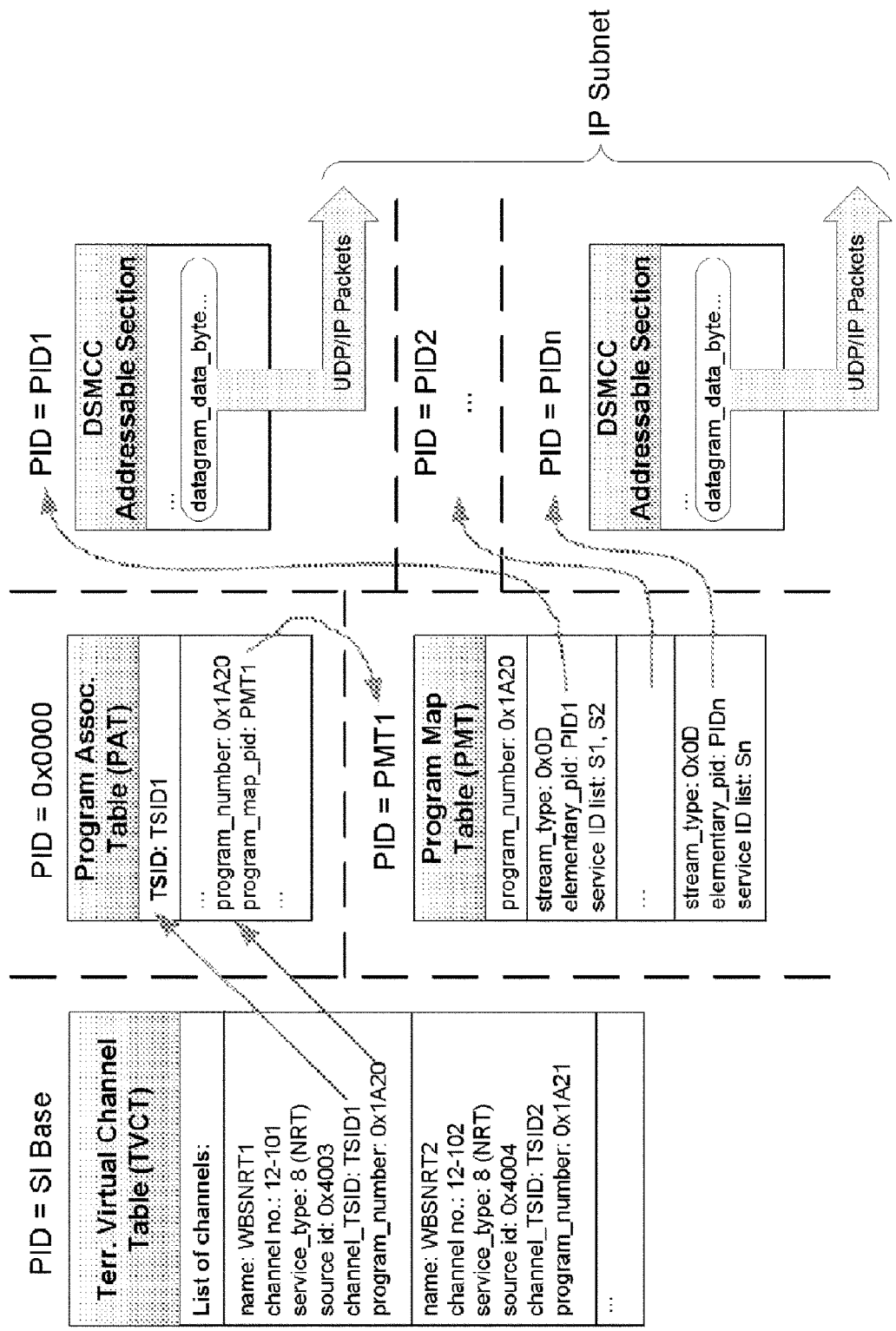
FIGS. 9 and 10 are views illustrating a configuration of program table information for NRT service.

Referring to FIG. 9, a terrestrial VCT (TVCT) may provide information on virtual channels, and may include service_type representing the NRT service. For example, the NRT service delivered through an IP packet may be represented with service_type having a value of 0x08.

Moreover, the TVCT may include program_number and channel_TSID indicating information in a PAT, and the PAT may indicate a PMT through program_map_pid.

Furthermore, a TS packet corresponding to a PID elementrary_pid in the PMT may include a DSMCC Addressable Section, and may deliver an IP packet for the NRT service by using the DSMCC Addressable Section.

For example, IP packets for NRT services in one virtual channel may be delivered as TS packets that respectively correspond to a plurality of PID values, and IP packets delivered through all DSM-CC addressable sections referred from the PMT may be gathered to constitute one IP subnet.

Figure 10:
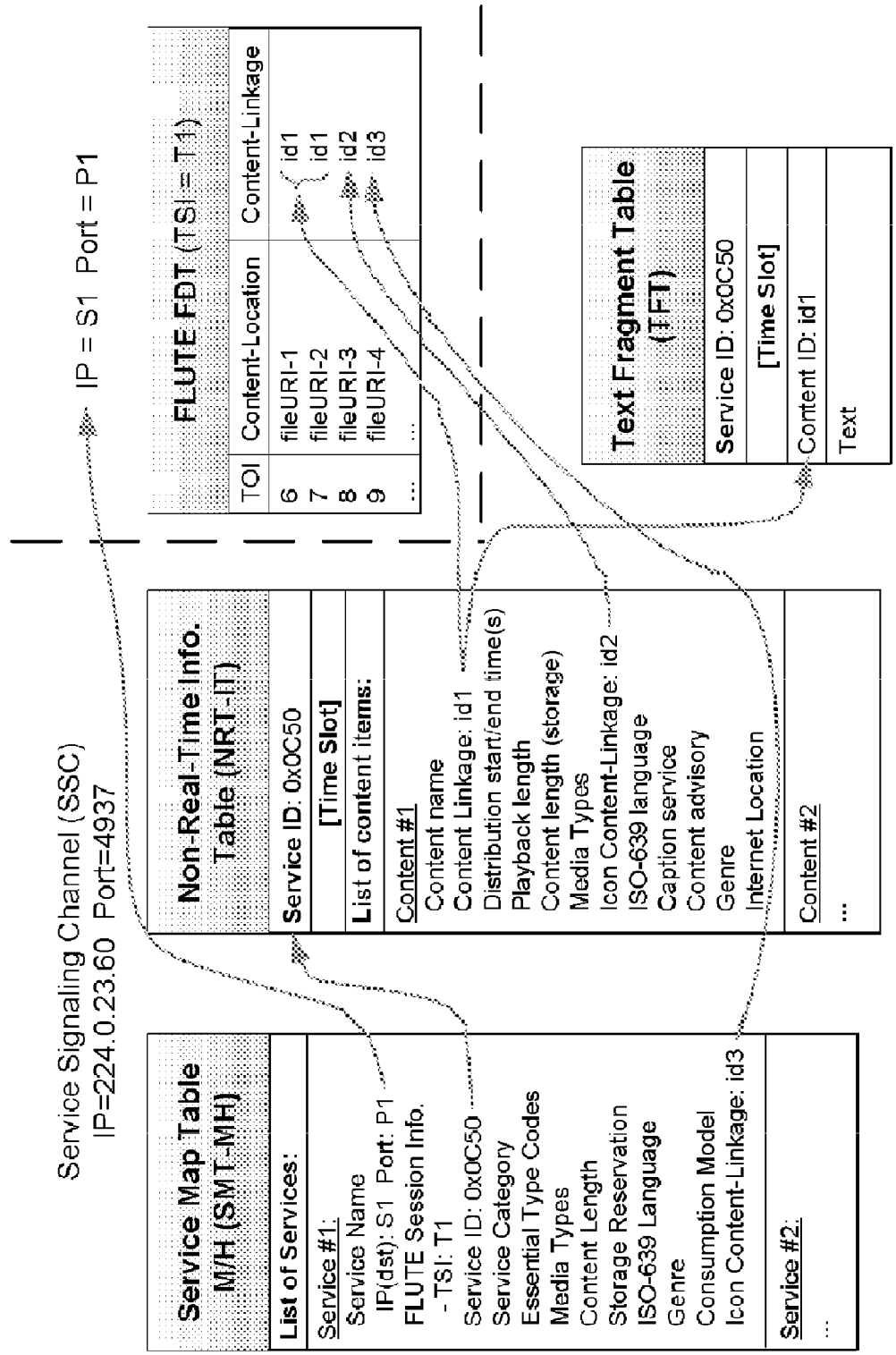

Referring to FIG. 10, for the NRT service, the program table information may include a Non-Real-Time Information Table (NRT IT), a Service Map Table (SMT), and a FLUTE File Delivery Table.

Moreover, the NRT IT may further include information on NRT contents received through the NRT service and the SMT-MH may be linked to the NRT IT by using a Service ID.

The SMT-MH may be linked to a FLUTE File Delivery Table (FDT) by using IP dst (i.e., a destination IP address), port (i.e., a port number), and a Transport Session Indicator (TSI).

According to an embodiment, IP dst and port in the SMT-MH may be 224.0.23.60:4937, i.e., a Service Signaling Channel (SSC) according to the ATSC standard.

The SMT-MH may include service-level attributes for NRT services in a TS, and for this, may consist of syntax as shown in FIGS. 11 and 12.

For example, for the NRT service, service category of the SMT-MH may be set with 0x0E.

A content linkage in the NRT IT may correspond to at least one file of the FLUTE FDT, and the FLUTE FDT may include Content-Location for each file, for example, a Uniform Resource Locator (URL).

Moreover, an icon content-linkage in the SMT-MH or NRT-IT may correspond to a file including a graphic icon in the FDT.

Additionally, it may be linked to a Text Fragment Table (TFT) by using a content linkage in the NRT-IT, and the TFT may provide text metadata for corresponding content.

FIG. 13 is a view illustrating syntax of the NRT IT.

Referring to FIG. 13, the NRT-IT may include information on RT content such as a content_name, a content_linkage, duration/expiration, playback_length, or content_length.

The configuration of the program table information for NRT service described with reference to FIGS. 9 to 13 is just one embodiment, and thus, the present invention is not limited thereto.

For example, the information on NRT service may be delivered through the following method.

Once 0x95 representing the NRT service is delivered as a stream_type to a Service Location Descriptor (SLD) in the TVCT, the broadcast receiving device recognizes that a corresponding virtual channel corresponds to the NRT service.

Additionally, Once 0x95 representing the NRT service is delivered as stream_type to a Service Location Descriptor (SLD) in the TVCT, the broadcast receiving device recognizes that a corresponding virtual channel corresponds to the NRT service.

The DST delivers additional information for providing data service, and an association tag for the NRT service may be searched by using the additional information.

The association tag is connected to one of streams of the PMT, and a stream corresponding to the PID that the one indicates may include the information on NRT service.

Furthermore, a TS packet corresponding to the PID that the association tag of the PMT indicates may include a DSMCC Addressable Section, as described with reference to FIG. 9.

According to an embodiment, a broadcast transmitting device may transmit additional information on a broadcast channel or program through Internet service.

FIG. 14 is a view illustrating a method of providing an extended EPG through Internet service.

Referring to FIG. 14, an SI parser 250 of a broadcast transmitting device parses program table information, for example, PSI and PSIP tables, received through a DTV tuner 200, and outputs EPG information by parsing an EIT.

Moreover, a network interface unit 260 is connected to internet by using Ethernet TCP/IP, and receives additional information provided through Internet service.

An HTML/XML parser 270 parses the additional information received through the network interface unit 260 in order to output EGP information.

EPG information obtained from the program table information received through the DTV tuner 200 and EGP information obtained from the additional information received through the network interface unit 260 are combined to constitute an internet-extended EPG.

Figures 15, 16:
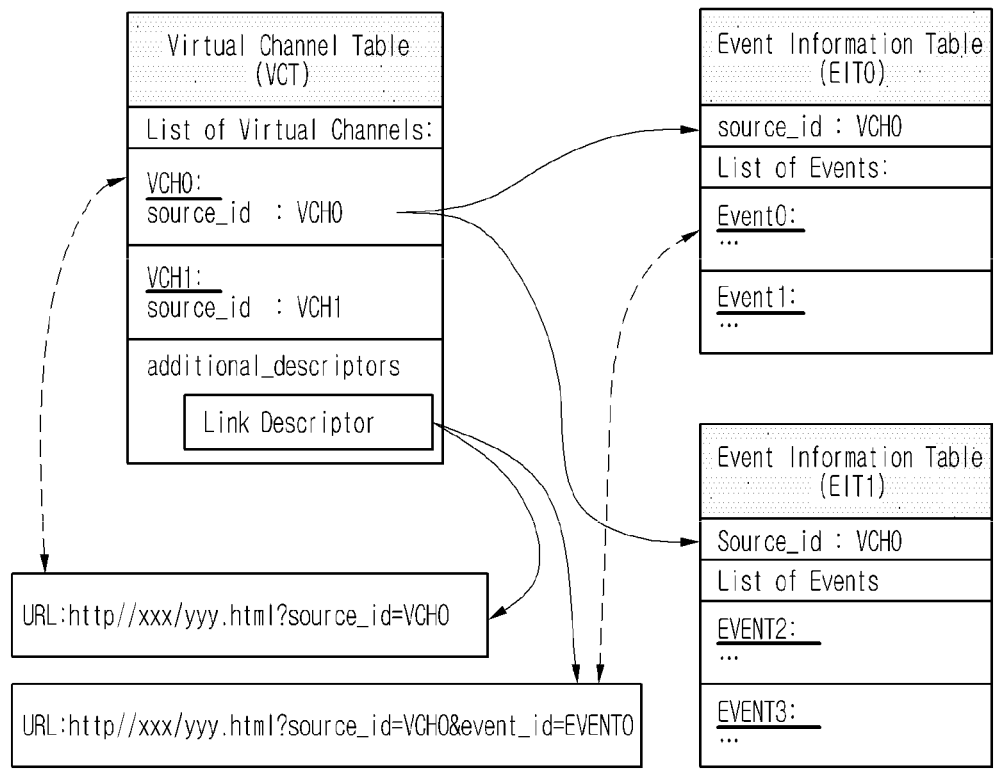
FIG. 15 is a view illustrating a syntax structure of a link descriptor according to an embodiment.
FIGS. 16 to 18 are views illustrating data linkage between the link descriptor, VCT, and EIT according to embodiments.

FIG. 15 is a view illustrating a syntax structure of a link descriptor according to an embodiment.

The link descriptor is included in the program information table so that it may represent link information for linking a broadcast channel or program to additional information thereof.

Referring to FIG. 15, descriptor_tag in the link descriptor defines a tag of a corresponding descriptor, and descriptor_length represents the length of a corresponding descriptor.

Additionally, number_of_links represents the number of links to a corresponding channel or program.

For example, if there are as additional information for a specific program a thumbnail image provided through NRT service and a preview video provided through Internet service, the two additional information are defined each with one link, and accordingly, number_of_links becomes "2".

link_type represents that what information is included in a corresponding link, i.e., types of additional information according to a corresponding link, and may have values as shown in Table 2.

TABLE 2

|  | link_type |
| --- | --- |
| Html portal | 0 × 01 |
| Thumbnail | 0 × 02 |
| Preview clip | 0 × 03 |
| EPG | 0 × 04 |
| Highlight | 0 × 05 |
| Multiview | 0 × 06 |

Referring to Table 2, the types of corresponding additional information represented by link_type may be one of an Html Portal, a thumbnail, a preview clip, an EPG, a highlight image, and a multiview image. "0x00", "0x01", "0x02", "0x03", "0x04", "0x05" 및 "0x06" may be assigned to the six link types, respectively.

link_media represents that which path is used when a corresponding link is delivered, and that is, may represent a media corresponding to a path through which the additional information is received.

Moreover, link_byte represents the ID of a corresponding link, and link_length represents the length of link_byte.

Since the ID of a link for accessing each media that receives the additional information may be different, link_length and link_byte may be designated to identify this.

Table 3 represents link_media and link_byte designated for each media that provides the additional information according to an embodiment.

TABLE 3

|  | link_media | link_byte |
| --- | --- | --- |
| NRT service | 0 × 02 | service_id, content_id |
| Internet service | 0 × 03 | URL |

Referring to Table 3, link_media having 0x02 and 0x03 may be respectively designated for NRT service and Internet service, which provide the additional information.

Additionally, additional information provided through NRT service may be designated as link_byte by using service_id of the NRT service and content_id of NRT content including the additional information.

Additionally, additional information provided through Internet service may be designated as link_type by using a URL for downloading the additional information.

Moreover, content_id may correspond to content_linkage or content_name_text( ) of the NRT IT described with reference to FIG. 13.

A broadcast channel or program may be linked to an NRT IT of additional information transmitted through NRT service by using link_byte.

Additionally, when the additional information is transmitted through Internet service, the broadcast receiving device may access to a server by using a URL, i.e., link_byte of a corresponding link, and then, download corresponding additional information.

According to an embodiment, when new additional information transmission medium is added in addition to the NRT service and Internet service, a new value for link_media besides "0x02" 및 "0x03" may be added.

mime_type of the link descriptor represents an expression type of a corresponding link, and mime_type_length represents the length of mime_type.

For example, mime_type represents that additional information corresponds to which type of video, text, and image, and represents an extension of a file including the additional information in addition to that.

Moreover, description represents detailed information on a corresponding link, and description_length represents the length of the description.

For example, the description may include the title of corresponding additional information and description thereof.

According to an embodiment, link descriptor According to an embodiment, the link descriptor described with reference to FIG. 15 may be included in the program table information, and for example, may be included in a VCT or an EIT.

Figure 17:
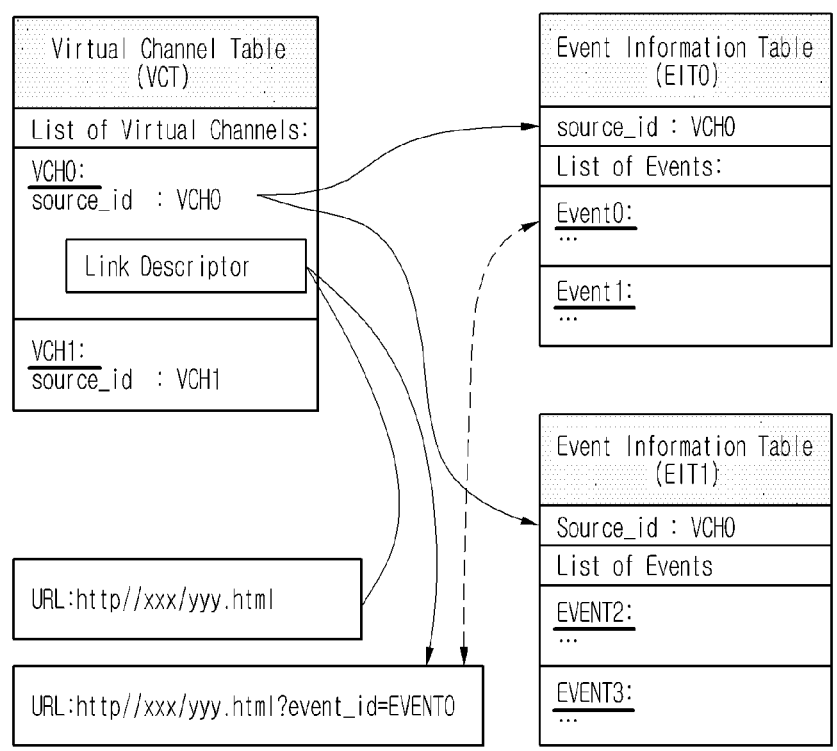
Figure 18:
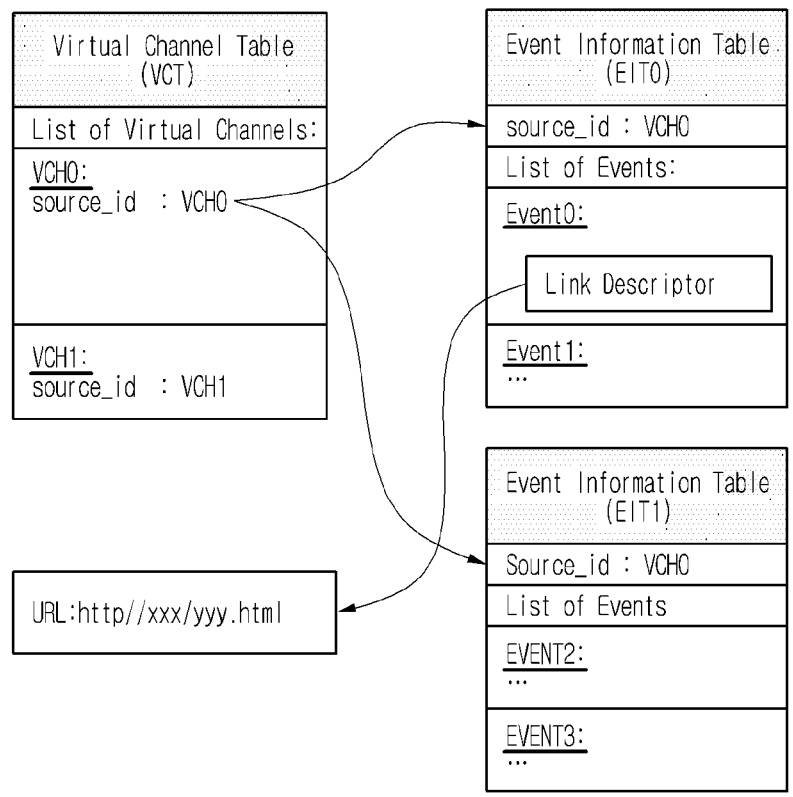

FIGS. 16 to 18 are views illustrating data linkage between the link descriptor, VCT, and EIT when the additional information is transmitted through Internet service according to embodiments.

Referring to FIG. 16, by using a first virtual channel in a VCT, i.e., source_id of "VCH0", EIT0 and EIT1 having source_id of "VCH0" may be connected.

Additionally, by using each program table information in the EIT0 and EIT1, it is recognized that there are four programs "EVENT0", "EVENT1", "EVENT2", and "EVENT3" provided to the virtual channel "VCH0" through RT service.

Moreover, a link descriptor may be included in additional_descriptors of the VCT.

Since the additional descriptor represents information on MUX or a physical channel corresponding to the VCT, additional information on the MUX or physical channel may be provided through Internet service connected using the link descriptor.

For example, the additional information on MUX may be information on a TV station that transmits corresponding MUX, and in more detail, may include a broadcaster logo or a URL of a broadcaster homepage.

Furthermore, a URL of Internet service that provides additional information on the MUX or physical channel may be designated by the link_byte of the link descriptor.

Additionally, when a virtual channel identifier source_id is added to an URL in link_byte, additional information on a corresponding virtual channel may be provided through Internet service.

For example, as shown in FIG. 16, when a URL is designated with "http://xxx/yyy.html?source_id=VCH0" in the link descriptor, additional information on a virtual channel "VCH0" corresponding to source_id may be provided through Internet service of a corresponding URL.

When a broadcast program identifier event_id is added to a URL in link_byte, additional information on a corresponding program may be provided through Internet service.

For example, as shown in FIG. 16, when a URL is designated with "http://xxx/yyy.html?source_id=VCH0&event_id=EVENT0" in the link descriptor, additional information on the program "EVENT0" corresponding to event_id may be provided through Internet service of a corresponding URL.

Referring to FIG. 17, the link descriptor may be included in descriptors of the VCT.

Since the descriptor represents information on a corresponding physical channel, additional information on the virtual channel may be provided through Internet service connected using the link descriptor.

For example, the additional information on the virtual channel may include a virtual channel logo or a channel homepage.

As shown in FIG. 17, when a URL is designated with "http://xxx/yyy.html" in the link descriptor, additional information on a virtual channel "VCH0" having the link descriptor may be provided through Internet service having the URL.

Moreover, when a broadcast program identifier event_id is added to a URL in link_byte, additional information on a corresponding program may be provided through Internet service.

For example, as shown in FIG. 17, when a URL is designated with "http://xxx/yyy.html?event_id=EVENT0" in the link descriptor, additional information on the program "EVENT0" corresponding to event_id may be provided through Internet service of a corresponding URL.

Referring to FIG. 18, the link descriptor may be included in descriptors of the EIT.

Since the descriptor of the EIT represents information on a corresponding event, additional information on a broadcast program may be provided through Internet service connected using the link descriptor.

For example, the additional information on a broadcast program may include an HTML page, a thumbnail image, a highlight video, a preview video, a multiview video, or detailed information, which relate to the corresponding broadcast program.

As shown in FIG. 18, when a URL is designated with "http://xxx/yyy.html" in the link descriptor, additional information on a broadcast program "EVENT0" having the link descriptor may be provided through Internet service having the URL.

Figure 19:
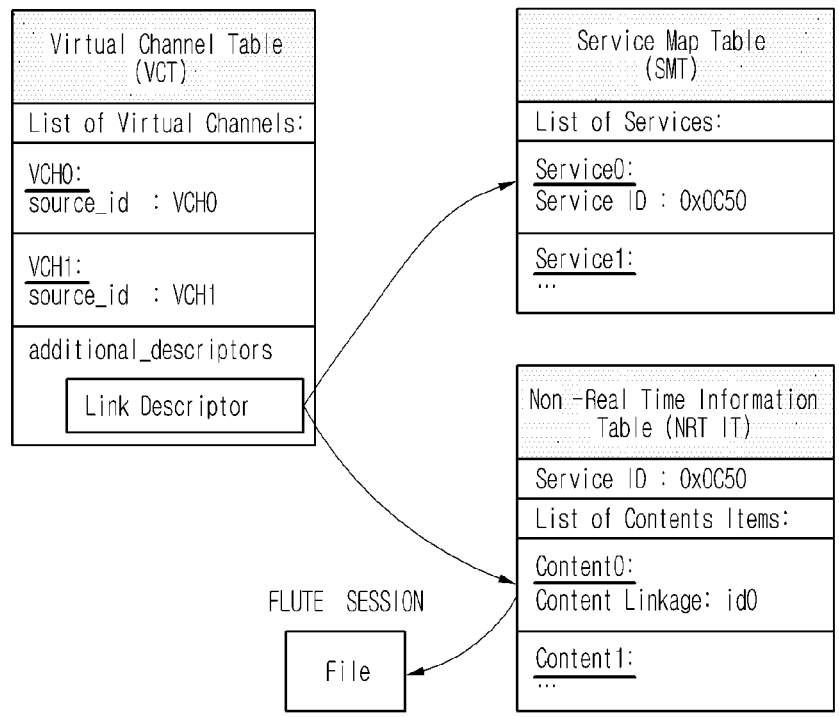
FIGS. 19 to 21 are views illustrating data linkage between the link descriptor, VCT, SMT, and NRT IT according to embodiments.
Figure 20:
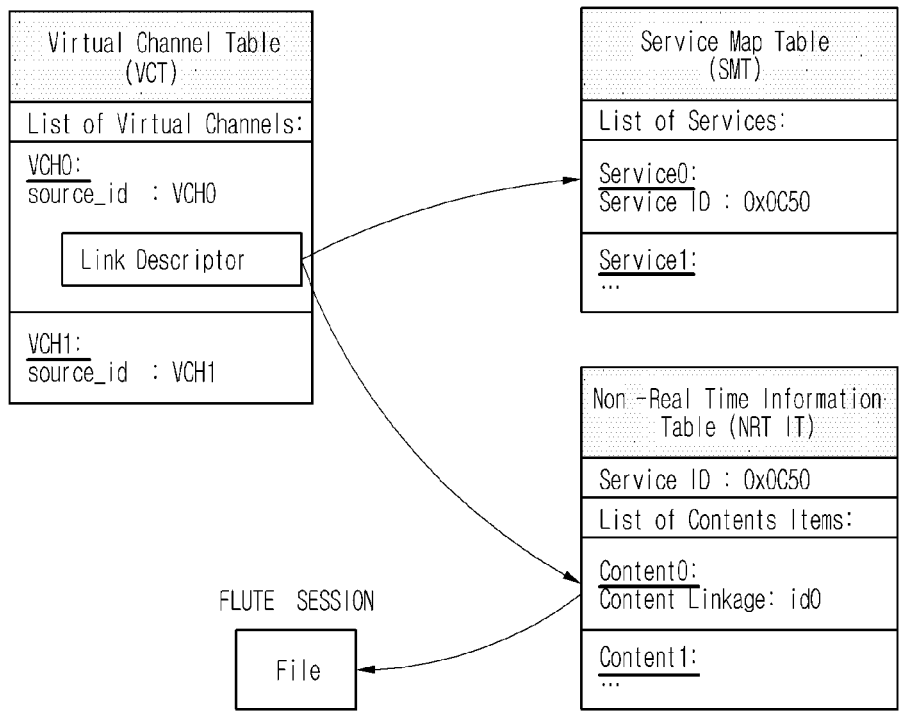
Figure 21:
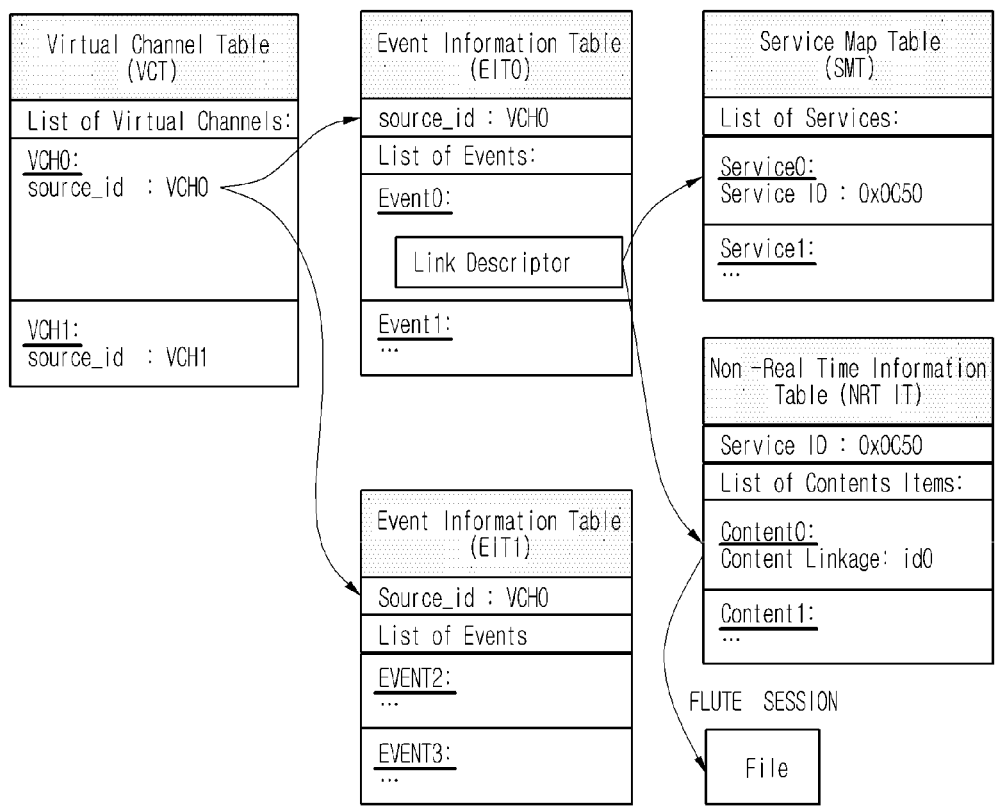

FIGS. 19 to 21 are views illustrating data linkage between the link descriptor, VCT, and SMT when the additional information is transmitted through NRT service according to embodiments.

Referring to FIG. 19, with the link descriptor in additional_descriptors of the VCT, additional information on MUX or a physical channel may be provided through NRT service connected using the link descriptor.

Furthermore, service_id and content_id of the NRT service providing the additional information on MUX or a physical channel may be designated by the link_byte of the link descriptor.

For example, when service_id is designated with "0x0C50" and content_id is designated with "id0" in link_byte, a File of a FLUTE session corresponding to service_id and content_id may be connected through an SMT and an NRT IT.

The File transmitted using the NRT service may include the additional information on MUX or a physical channel.

Referring to FIG. 20, with the link descriptor in descriptors of the VCT, additional information on a corresponding virtual channel may be provided through NRT service connected using service_id and content_id of the link descriptor.

Referring to FIG. 21, the link descriptor may be included in descriptors of the EIT, so that additional information on a corresponding broadcast program may be provided through NRT service.

FIG. 22 is a view illustrating a syntax structure of an Extended Text Message (ETM) location descriptor including link information, and illustrating a method of extending ETM_location in a VCT or an EIT.

ETM_location represents whether there is an ETT that delivers detailed information on a broadcast channel or program in a plain text format.

According to an embodiment, extending ETM_location may deliver the additional information on a broadcast channel or program through NRT service or Internet service.

For example, ETM_location_extension_descriptor shown in FIG. 22 may follow ETM_location that is to extend in the VCT or EIT.

Referring to FIG. 22, descriptor_tag in ETM_location_extension_descriptor defines a tag of a corresponding descriptor, and descriptor_length represents the length of a corresponding descriptor.

ETM_in_PTC_carrying_this_PSIP represents that an ETT is included in a TS through which a corresponding table was received, and has the same value as "0x01" of ETM_location.

Moreover, ETM_in_PTC_specified_by_the_channel_TSID represents that an ETT is included in a TS through which a corresponding channel is received, and has the same value as "0x02" of ETM_location.

Moreover, ETM_in_NRT_service represents that the above additional information is provided through NRT service, and ETM_in_Internet_service represents that the above additional information is provided through Internet service.

mime_type of the link descriptor represents a format, i.e., an expression type of additional information, and mime_type_length represents the length of mime_type.

link_length represents service_id and content_id in the case of a link following link_length, i.e., NRT service, and the length of a URL in the case of Internet service.

service_id represents an identifier of service described in an SMT in relation to NRT service that transmits the additional information, and content_id represents an identifier of content described in an NRT-IT.

Moreover, a URL represents the position of Internet service that transmits the additional information.

Hereinafter, a broadcast signal receiving method and device according to an embodiment will be described in more detail with reference to FIGS. 23 to 26.

The broadcast signal receiving method may be obtained through inverse operations of the broadcast signal transmitting method described with reference to FIGS. 4 to 22, and thus, overlapping descriptions will be omitted.

Figure 24:
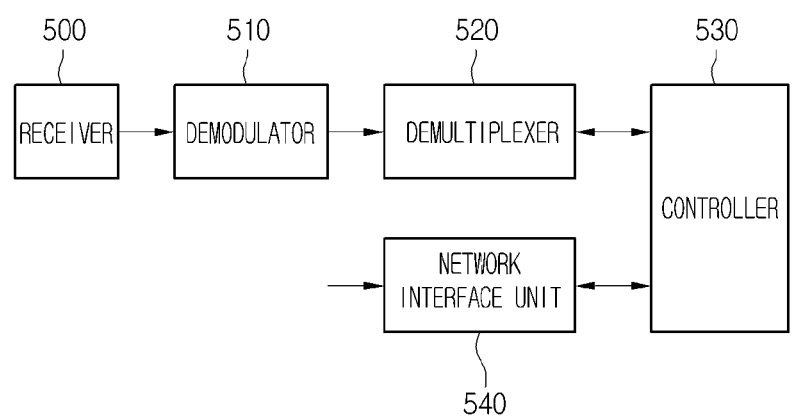
FIG. 24 is a block diagram illustrating a configuration of a broadcast signal receiving device according to an embodiment.

FIG. 23 is a flowchart illustrating a method of receiving a broadcast signal according to a first embodiment, and its description is made in relation to a block diagram of a broadcast receiving device shown in FIG. 24.

Referring to FIG. 23, a receiver 500 of the broadcast receiving device receives a broadcast signal in operation S400, and a demultiplexer 520 extracts a broadcast stream and program table information from the received broadcast signal in operation 5410.

Additionally, the received broadcast signal is demodulated by the demodulator 510, and then, is inputted to the demultiplexer 520. Then, a decoder (not shown) decodes the extracted program table information and outputs it to a controller 540. Then, the broadcast stream may be parsed using the extracted table information.

Then, the controller 540 obtains link information from the extracted program table information in operation S420, and the receiver 500 or a network interface unit 540 receives additional information by using the obtained link information in operation 5430.

For example, when the additional information is provided through NRT service, the receiver 500 may receive the additional information in addition to the broadcast signal, and the received additional information may be stored in a high capacity storage medium (not shown).

Additionally, when the additional information is provided through Internet service, the network interface unit 540 accesses an internet server to receive the additional information.

Additionally, the program table information may include tables such as the MGT, VCT, EIT, ETT, RRT or STT described with reference to FIGS. 5 to 7, or tables for NRT service such as the SMT, NRT IT, FDT or TFT described with reference to FIGS. 9 to 13.

According to another embodiment, a path through which the additional information is received may be determined by the content of a link information related descriptor, an internet access of a broadcast receiving device, and reception availability of NRT content.

Figure 25:
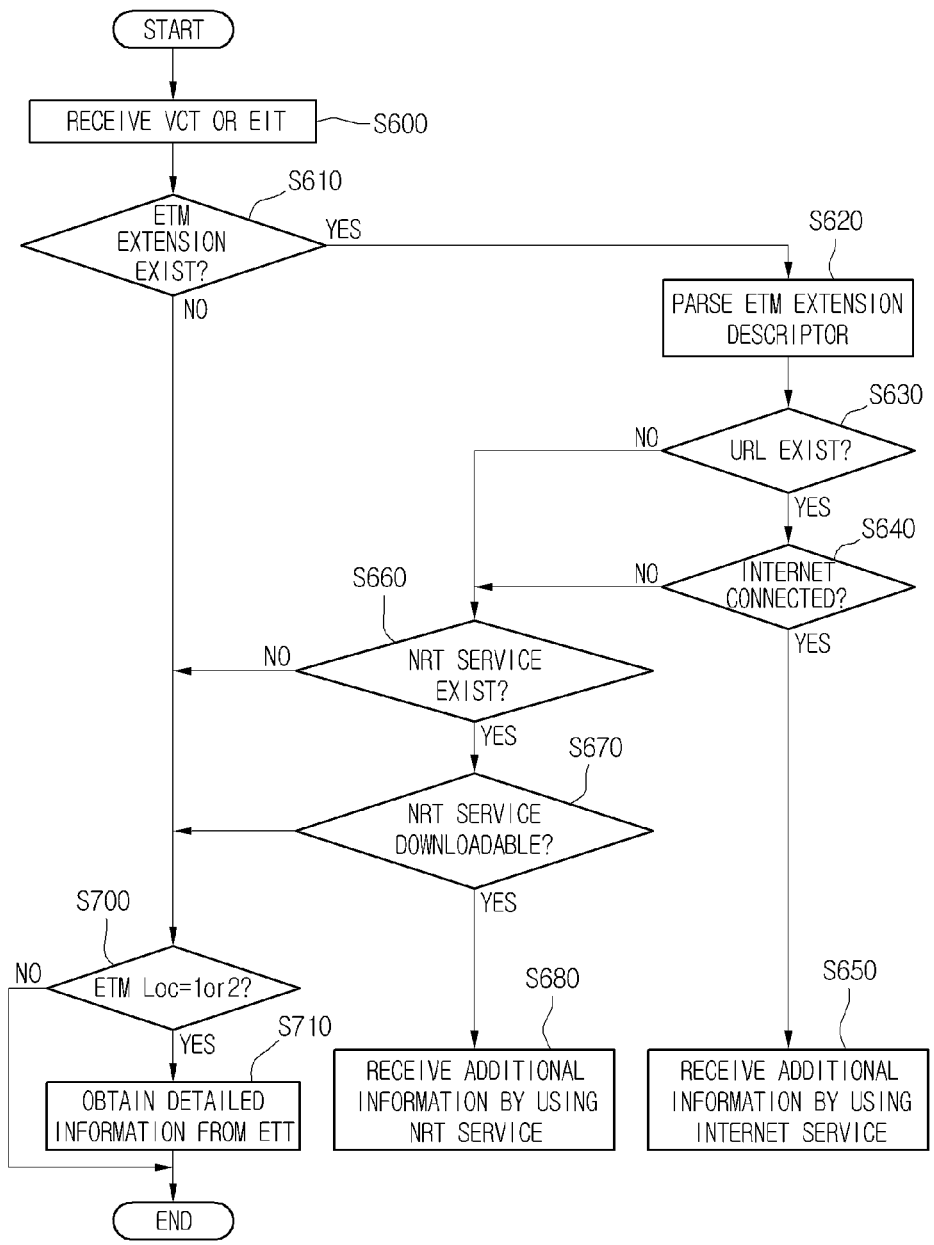
FIG. 25 is a flowchart illustrating a method of determining a path through which additional information is received according to an embodiment.

FIG. 25 is a flowchart illustrating a method of determining a path through which additional information is received according to an embodiment.

Referring to FIG. 25, when a receiver 500 of a broadcast receiving device receives a VCT or an EIT in operation 5600, a controller 530 confirms whether there is an ETM extension in the received VCT or EIT in operation 5610.

For example, the ETM extension may be provided using ETM_location_extension_descriptor described with reference to FIG. 22.

If there is the ETM extension, the controller 530 parses a corresponding ETM extension descriptor in operation 620, and then confirms that there is a URL in operation 5630.

If there is the URL in the ETM extension descriptor, the controller 530 confirms whether the broadcast receiving device is connected to internet through the network interface unit 540 in operation 5640.

If the broadcast receiving device is connected to internet, a path for receiving the additional information is determined by receiving the additional information through Internet service in operation S650

Additionally, if there is no URL in the ETM extension descriptor or the broadcast receiving device is not connected to internet, the controller 530 confirms whether there is NRT service in operation 5660.

For example, the controller 530 confirms whether there are service_id and content_id in the ETM extension descriptor in order to confirm whether there is an NRT service providing additional information.

If there is the NRT service, the controller 530 confirms whether the NRT service is available for downloading in operation 5670, and if downloadable, determines that the additional information is received by using the NRT service in operation 5680.

Additionally, if there is no NRT service or the NRT service is unavailable, the controller 530 confirms whether ETM Loc, i.e., an ETM location, has a value of "1" or "2" in operation 5700.

If ETM Loc has "0", there is no ETT; if it has "1", the ETT is included in a TS through which a corresponding table was received; and if it has "2", the ETT is included in a TS through which a corresponding channel is received.

Accordingly, when ETM Loc has "1" or "2", it is indicated that there is an ETT having detailed information on a corresponding broadcast channel or program.

Accordingly, when ETM Loc has "1" or "2", the controller 530 obtains the detailed information on a corresponding broadcast channel or program from the ETT in operation S710.

As described with reference to FIG. 25, the reception path of the additional information may be determined with a priority in the order of Internet service, NRT service, and ETT.

Figure 26:
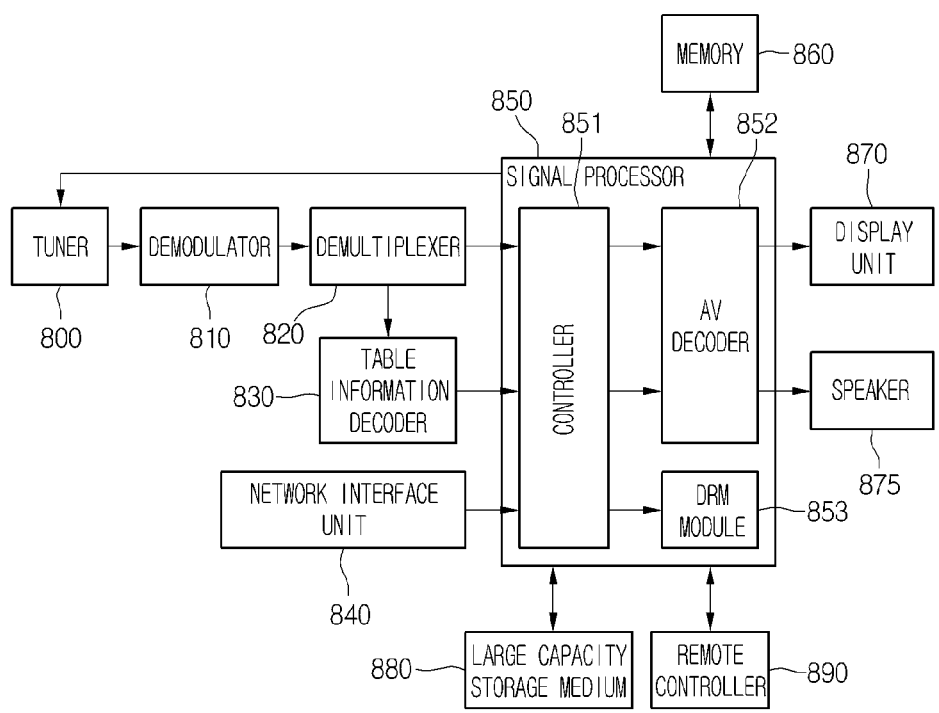
FIG. 26 is a block diagram illustrating a configuration of a broadcast signal receiving device according to an embodiment.

FIG. 26 is a view illustrating a configuration of a broadcast signal receiving device according to another embodiment, and overlapping contents described with reference to FIGS. 3 and 24 will be omitted.

Referring to FIG. 26, a demodulator 810 demodulates a broadcast signal received though a turner 800, and a demultiplexer 820 demultiplexes a TS inputted from the demodulator 810 to extract a broadcast stream and program table information.

Additionally, the tuner 800 may receive additional information provided through NRT service in additional to the RT broadcast signal.

A table information decoder 830 decodes the extracted program table information and outputs it to a controller 851.

Additionally, a network interface unit 840 may transceive data in connection to a wire/wireless network such as internet. For example, the network interface unit 840 may access an internet server with a URL, and then, may download additional information provided through Internet service.

For this, the network interface unit 840 may include a wireless network Phy and MAC.

A controller 851 of a signal processor 850 parses a broadcast stream inputted from the demultiplexer 820 by using the decoded first program table information, for example, a PSI and PSIP table, to output video stream and audio stream.

Additionally, the controller 851 processes content data inputted from the network interface unit 840, and output the processed content data to an AV decoder 852.

The AV decoder 852 decodes and outputs the video stream and audio stream inputted from the controller 851; a display unit 870 displays an image by using the decoded video data; and a speaker 875 outputs audio by using the audio data.

According to an embodiment, the controller 851 may obtain link information for linking to the additional information from the decoded program table, for example, a VCT or an EIT.

Moreover, the controller 851 may include a broadcast processor (not shown) for processing a broadcast stream inputted from the demultiplexer 820, and a broadband processor (not shown) for processing content data inputted from the network interface unit 840, and may further include a channel manager (not shown) and an application manager (not shown) beside those.

Additionally, the signal processor 850 may further include an internal memory (not shown), an internal DMR module (not shown) for communicating with an external DRM module, a PVR/Progressive download unit (not shown), and an input device (not shown).

A memory 860 may include ROM, RAM, and NVRAM, and may store the first and second program table information.

The broadcast receiving device may include a high capacity storage medium 880, and for example, the high capacity storage medium 880 may store contents received through NRT service.

Furthermore, a remote controller 890 may control an operation of the broadcast receiving device at a user's input.

Figure 27:
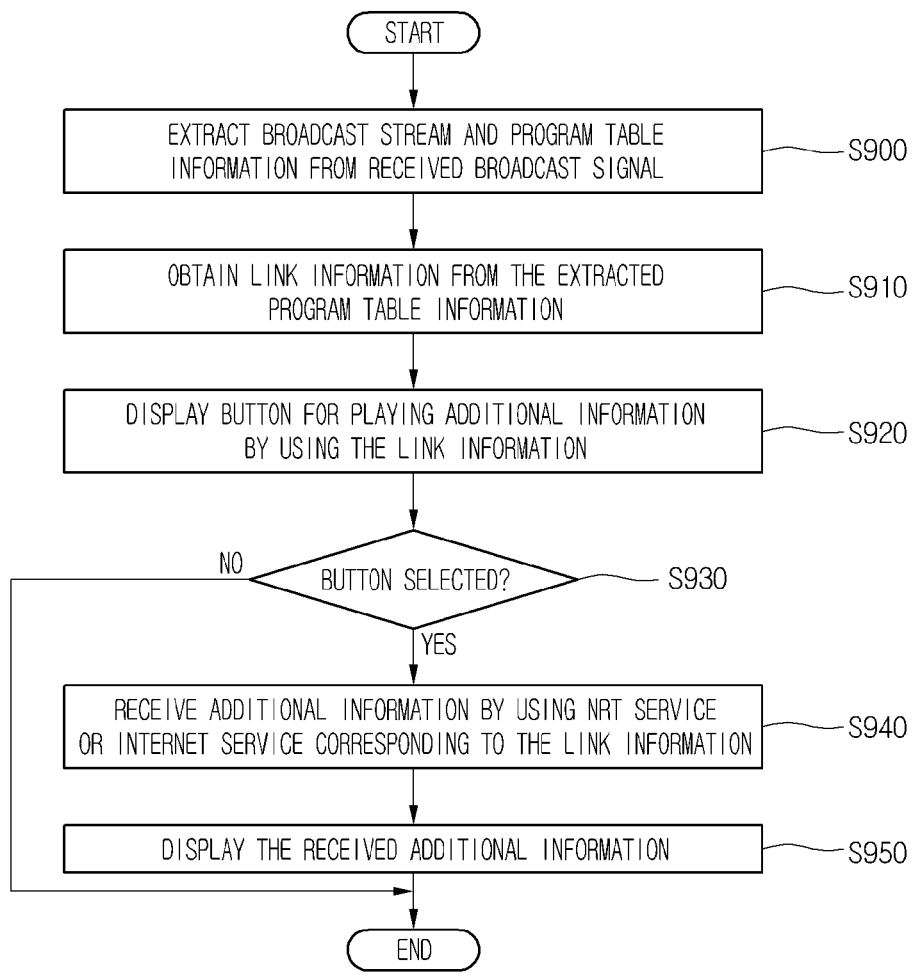
FIG. 27 is a flowchart illustrating a method of receiving a broadcast signal according to a second embodiment.

FIG. 27 is a view illustrating a method of receiving a broadcast signal according to a second embodiment, and overlapping contents described with reference to FIGS. 23 and 26 will be omitted.

Referring to FIG. 27, the broadcast receiving device extracts a broadcast stream and program table information from the received broadcast signal in operation 5910, and obtains link information from the extracted program table information in operation 5910.

Then, the broadcast receiving device displays a button for playing additional information by using the obtained link information in operation S930.

For example, if the additional information is a highlight video for a specific program, the controller 851 confirms that there is a highlight video in the additional information by using the link information, and accordingly, controls a display unit 870 to display a button for allowing a user to select playing of the highlight video.

When a user selects the display button in operation S930, the broadcast receiving device receives the additional information through NRT service or Internet service corresponding to the link information in operation 5940, and then plays and displays the received additional information in operation 5950.

Hereinafter, a configuration of a user interface (UI) displaying on a screen additional information received through the link information will be described in detail with reference to FIGS. 28 to 45.

Figure 28:
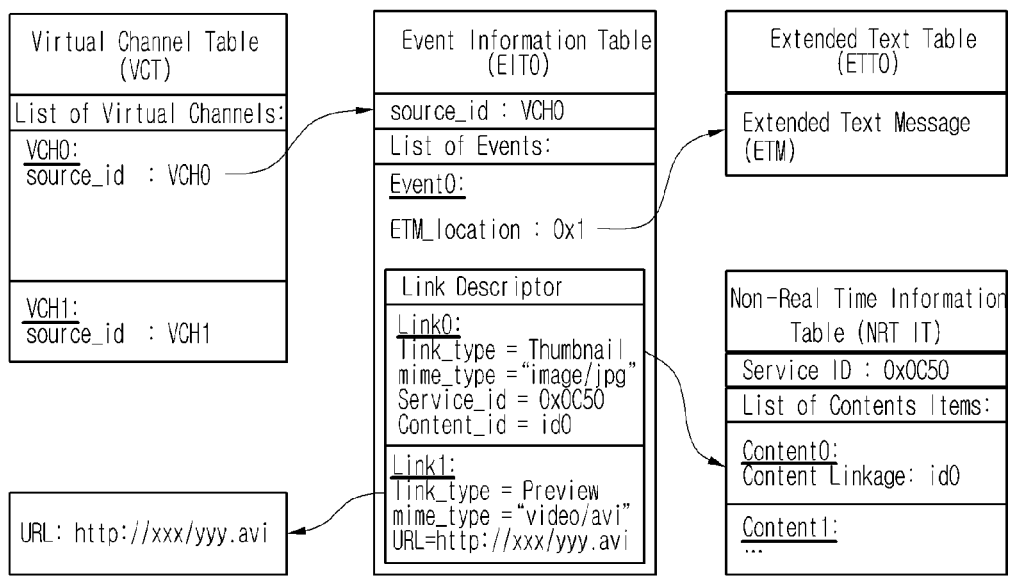
Figure 29:
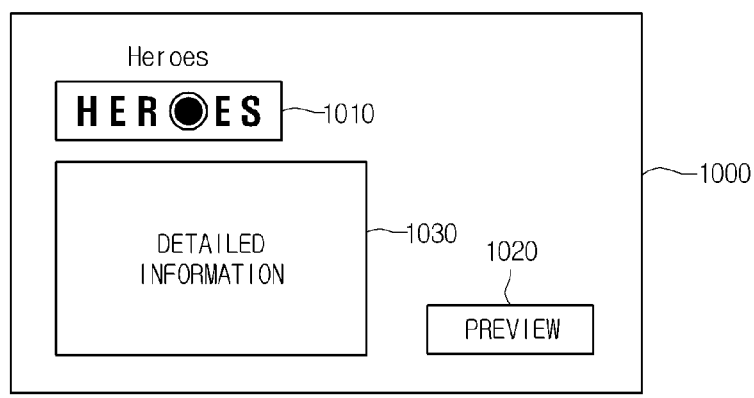

FIG. 28 is a view illustrating an example of the link information. FIG. 29 is a view illustrating an example of a UI displaying additional information received using the link information.

Referring to FIG. 28, there may be an ETT that provides detailed information consisting of text on "EVENT0" i.e., a program of a virtual channel "VCH0", and a link descriptor that represents additional information provided through NRT service and Internet service.

Moreover, the Link Descriptor may include two links "Link0" and "Link1". Additional information linked using "Link0" is a thumbnail image "jpg" file, which has content_id of "id0" and is provided through an NRT service having service_id of "0x0C50".

Additionally, the additional information linked using "Link1" is a preview video "avi" file, which is provided through Internet service having a URL of http://xxx/yyy.avi.

Referring to FIG. 29, a thumbnail image 1010 received through an NRT service corresponding to "Link0" of the link descriptor may be displayed on a screen 1000 of the broadcast receiving device, and the displayed thumbnail image 1010 may be an image representing a title of the corresponding program "EVENT0".

Additionally, a "PREVIEW" button 1020 for playing a preview video according to "Link1" of the link descriptor may be displayed on the screen 1000.

When a user selects the "PREVIEW" button 1020, the network interface unit 840 of the broadcast receiving device accesses http://xxx/yyy.avi i.e., a URL of "Link1" to download the preview video file through Internet service, and then, the downloaded preview video file may be played on the screen 1000.

Moreover, the detailed information 1030 in a text form may be displayed on the screen 1000 by using the ETM of ETTO shown in FIG. 28.

Figure 30:
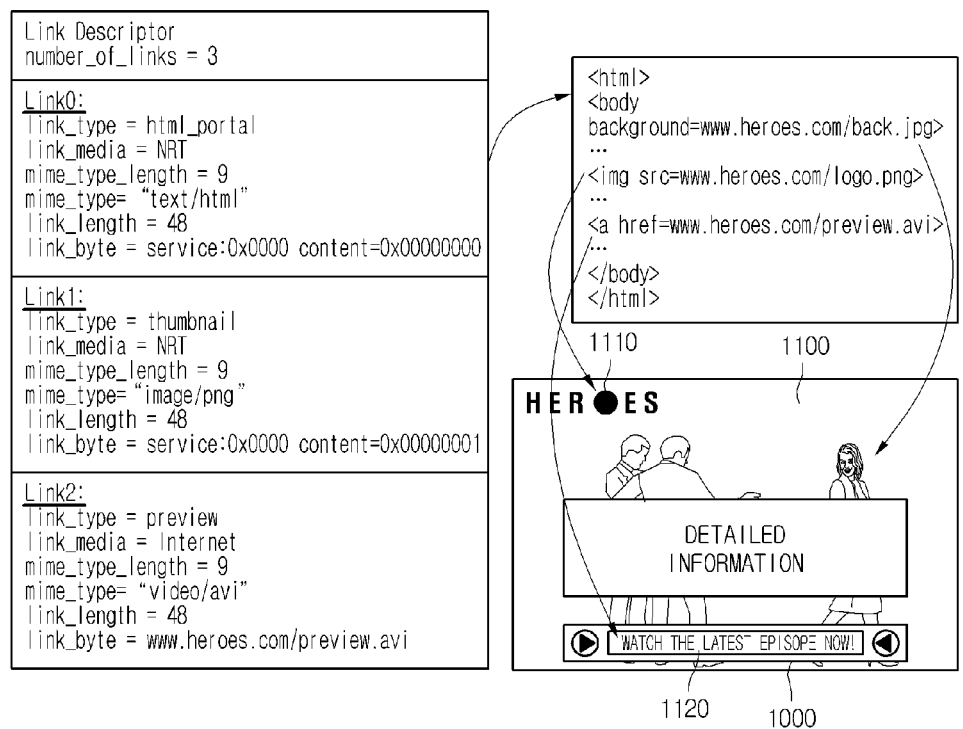
Figure 31:
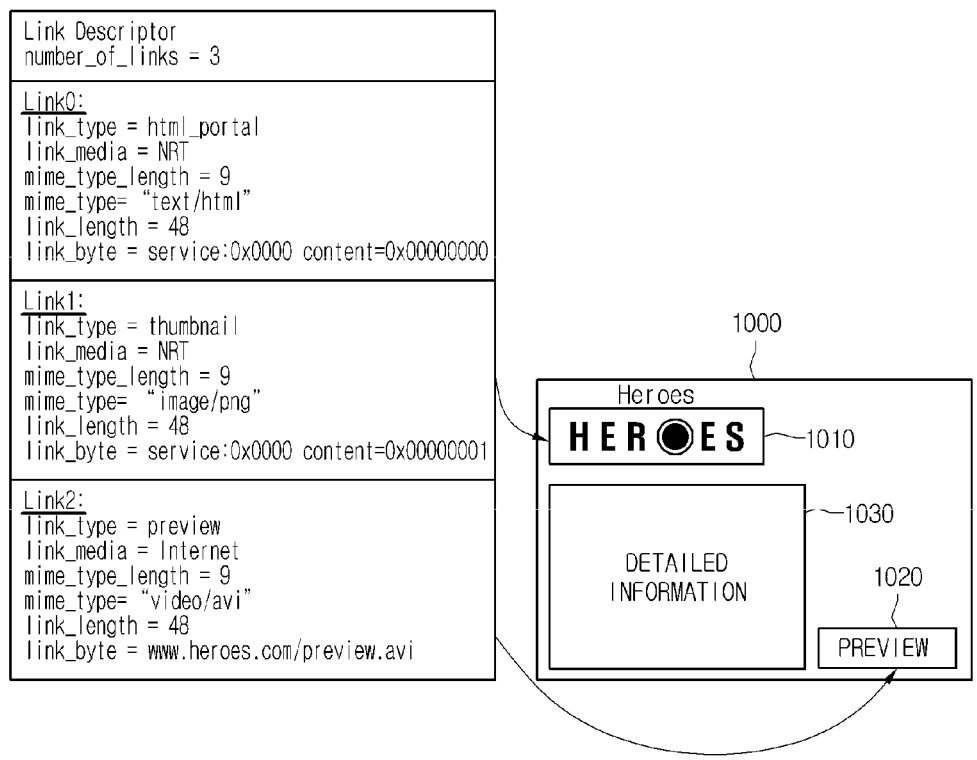

FIGS. 30 and 31 are views illustrating a method of configuring an additional information screen by using the link information.

Referring to FIG. 30, a Link Descriptor may include three links "Link0", "Link1", and "Link2". Additional information linked using "Link0" is provided through an NRT service having service_id of "0x0000", and is a text "html" file of html_portal having content_id of "0x00000000".

Moreover, additional information linked using "Link1" is provided through an NRT service having service_id of "0x0000", and is an image "png" file of a thumbnail type having content_id of "0x00000001".

Additionally, the additional information linked using "Link2" is provided through Internet service having a URL of "www.heroes.com/preview.avi", and is a video "avi" file of a preview type.

If the broadcast receiving device has a webbrowsing function, it receives an HTML page of "Link1" among the three links, and then configures an additional information screens shown in FIG. 30 by using the received HTML page.

According to the HTML page shown in FIG. 30, a "back.jpb" image file constituting a background screen 1100 is received through Internet service, and "logo.png" constituting a log image 1110 of a corresponding program is received through NRT service corresponding to "Link1".

Furthermore, "logo.png" may be received through Internet service by using a URL of the HTML page.

When a user selects a "PREVIEW" button 1120, a "preview.avi" video file constituting a preview video may be received through Internet service by using a URL of the HTML page.

Referring to FIG. 31, if a broadcast receiving device has no webbrowsing function, it cannot display the HTML page, but may receive additional information by using other links such as "Link1" and "Link2".

In this case, the broadcast receiving device displays detailed information 1030 by using an ETT, and configures an additional information screen by using remaining links except for a link of the HTML page in the link descriptor.

For example, "logo.png" constituting the logo image 1110 is received through an NRT service corresponding to "Link1", and a button 1020 for playing a preview video by using "Link2" may be displayed on a screen 1000.

FIGS. 32 to 37 are views illustrating a method of displaying a highlight image by using link information according to embodiments when a highlight image of sports events through NRT service or Internet service.

Referring to FIG. 32, there are links for two highlight images such as "Link0" and "Link1" in a Link Descriptor.

Moreover, a highlight image connected using "Link0" is an "avi" file that has content_id of "0x00000003", is provided through an NRT service having service_id of "0x0000", and has an image title of "Radoncic (first half 28 min)".

Moreover, a highlight image connected using "Link1" is an "avi" file that has content_id of "0x00000004", is provided through an NRT service having service_id of "0x0000", and has an image title of "Thiago (second half 28 min)".

Referring to FIG. 33, when a user requests displaying of additional information while watching a broadcast program, an additional information window 1200 for displaying additional information on a corresponding program may be displayed on an image 1210 of the broadcast program.

"K-league final", i.e., the title of the corresponding program, and detailed information 1240 may be displayed on the additional information window 1200 by using an EIT or ETT.

Additionally, as it is confirmed that there are two highlight images according to the link information shown in FIG. 33, buttons 1220 and 1230 for playing the two highlight images may be displayed on the additional information window 1200.

Figure 34:
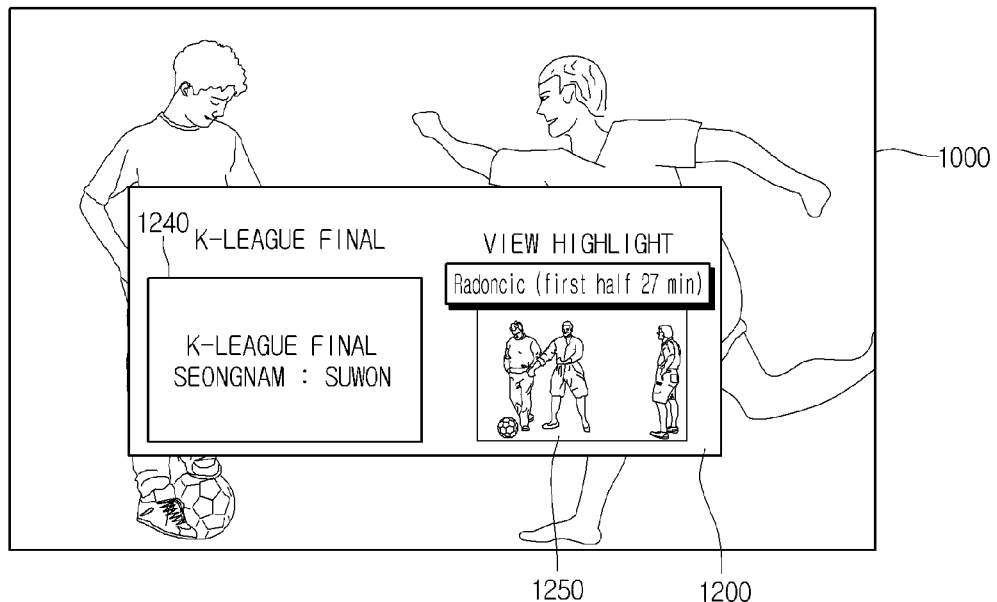

In this case, "Radoncic (first half 28 min)" designated in the description of "Link0" may be displayed as a title on the first button 1220 for playing a highlight image of "Link0", and "Thiago (second half 28 min)" designated in the description of "Link1" may be displayed as a title on the second button 1230 for playing a highlight image of "Link1", Referring to FIG. 34, when a user selects the first button 1220, a highlight image 1250 of "Radoncic (first half 28 min)" corresponding to the first button 1220 may be played in a partial area of the additional information window 1200.

In this case, the image 1210 of the RT broadcast program is played as it is if the additional information window 1200 does not cover the entire screen 1000, and only the highlight image 1250 is played if the additional information window 1200 covers the entire screen 1000.

Figure 35:
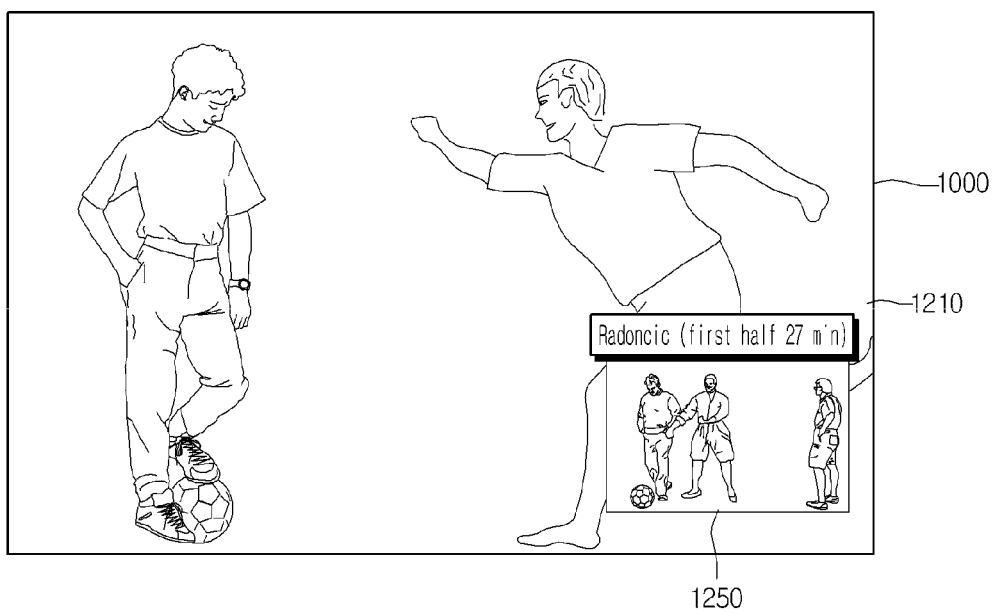

Referring to FIG. 35, when a user selects the first button 1220, the additional information window 1200 disappears, and the highlight image 1250 may be displayed on the image 1210 of the RT broadcast program in Picture In Picture (PIP).

Figure 36:
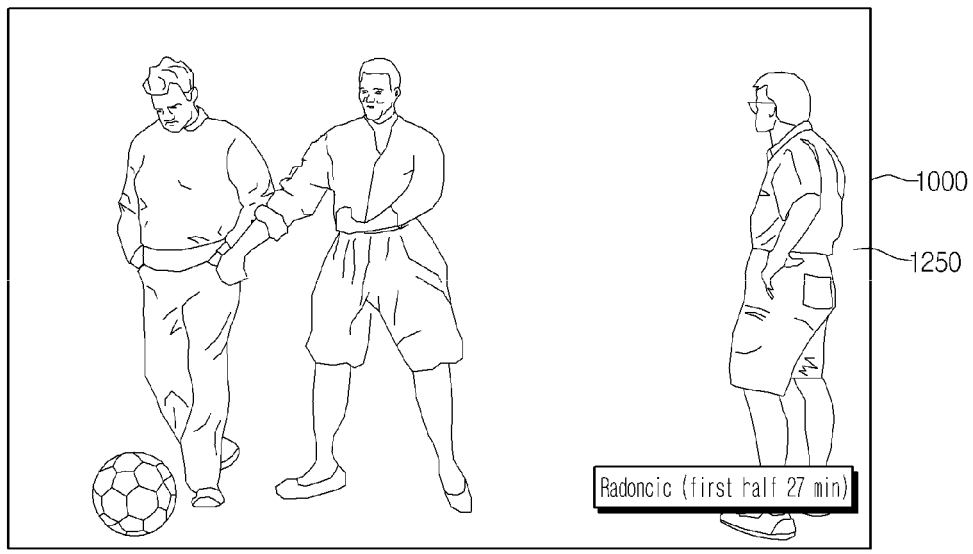

Referring to FIG. 36, when a user selects the first button 1220, the additional information window 1200 disappears, and the highlight image 1250 is displayed on the entire screen 1000. Accordingly, watching the RT broadcast may be stopped.

Figure 37:
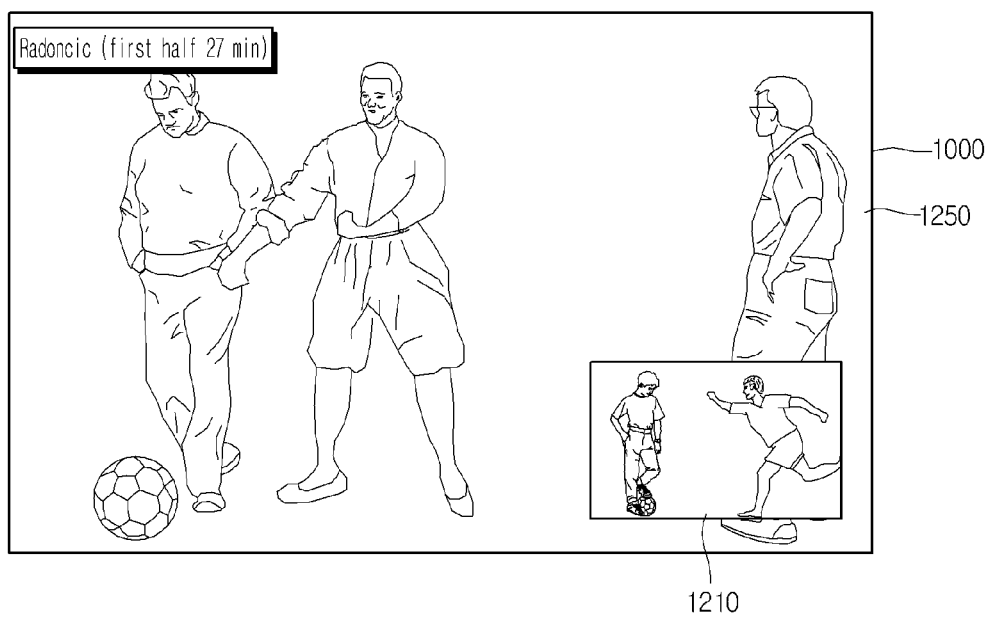

Referring to FIG. 37, when a user selects the first button 1220, the additional information window 1200 disappears; the highlight image 1250 is displayed on the entire screen 1000; and the image 1210 of the RT broadcast program is displayed on the highlight image 1250 in PIP.

When images are displayed in PIP as shown in FIG. 35 or 37, one or both sound of the RT broadcast and sound of the highlight image may be outputted at a user's selection using a remote controller 890.

FIGS. 38 to 43 are views illustrating a method of displaying a multiview image by using link information according to embodiments, when a multiview image captured at a different view point than a view point of an RT broadcast is displayed through NRT service or Internet service during watching a sports event.

Referring to FIG. 38, there are links for two multiview images such as "Link0" and "Link1" in a Link Descriptor.

A multiview image connected using "Link0" is an "avi" file provided through Internet service having a URL of "www.racing.com/racer.avi" and includes view point related information of "Racer #10".

A multiview image connected using "Link0" is an "avi" file provided through Internet service having a URL of "www.racing.com/finish.avi" and includes view point related information of "Finish Line".

Referring to FIG. 39, when a user requests displaying of additional information during watching a broadcast program, an additional information window 1300 for displaying the additional information may be displayed on an image 1310 of the program.

"Formula one" i.e., the title of the corresponding program, and detailed information 1340 may be displayed on the additional information window 1300 by using an EIT or ETT.

Additionally, as it is confirmed that there are two multiview images according to link information as shown in FIG. 38, buttons 1320 and 1330 for playing the two multiview images may be displayed on the additional information window 1300.

In this case, "Racer #10" designated in the description of "Link0" may be displayed as a view point of a corresponding image on the first button 1320 for playing the multiview image of "Link0", and "Finish Line" designated in the description of "Link1" may be displayed as a view point of a corresponding image on the second button 1330 for playing the multiview image of "Link1".

Figure 40:
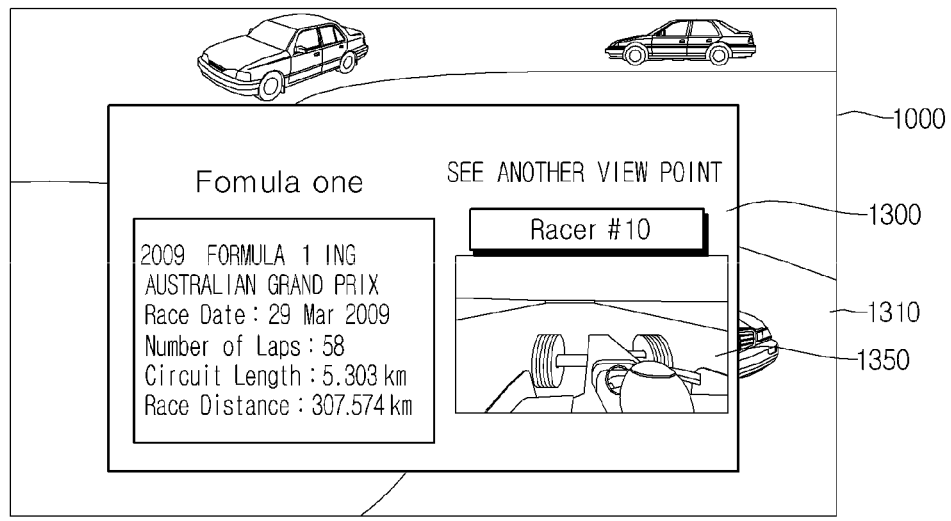

Referring to FIG. 40, when a user selects the first button 1320, the multiview image 1350 captured at a view point of "Racer #10" corresponding to the first button 1320 may be played in a partial area of the additional information window 1300.

In this case, the image 1310 of the RT broadcast program is played as it is if the additional information window 1300 does not cover the entire screen 1000, and only the multiview image 1350 is played if the additional information window 1300 covers the entire screen 1000.

Figure 41:
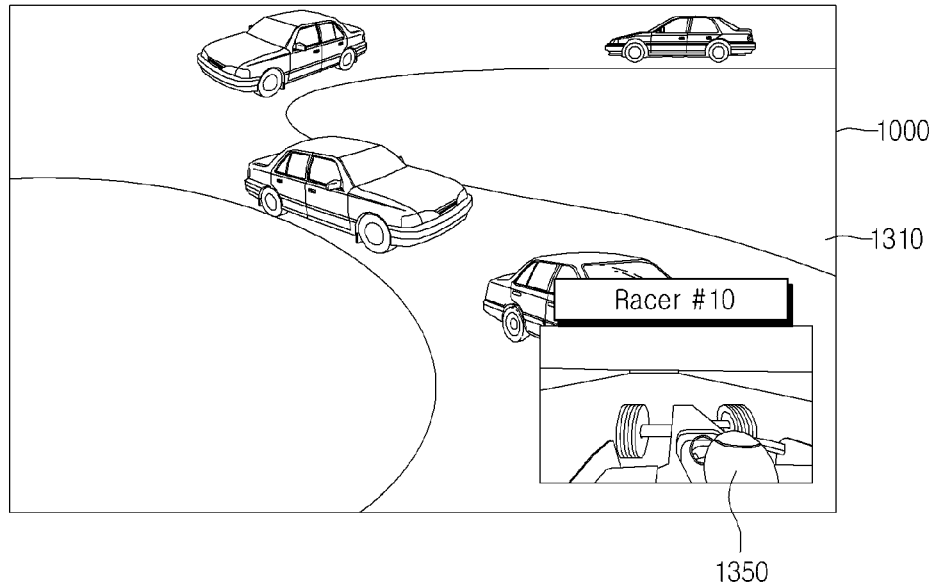

Referring to FIG. 41, when a user selects the first button 1320, the additional information window 1300 disappears, and the multiview image 1350 may be displayed on the image 1310 of the RT broadcast program in PIP.

Figure 42:
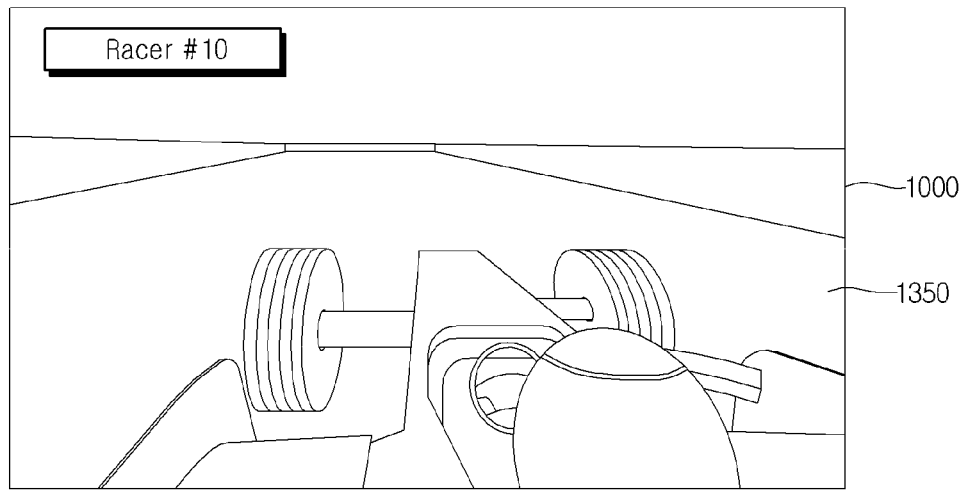

Referring to FIG. 42, when a user selects the first button 1320, the additional information window 1300 disappears, and the multiview image 1350 is displayed on the entire screen 1000. Accordingly, watching the RT broadcast may be stopped.

Figure 43:
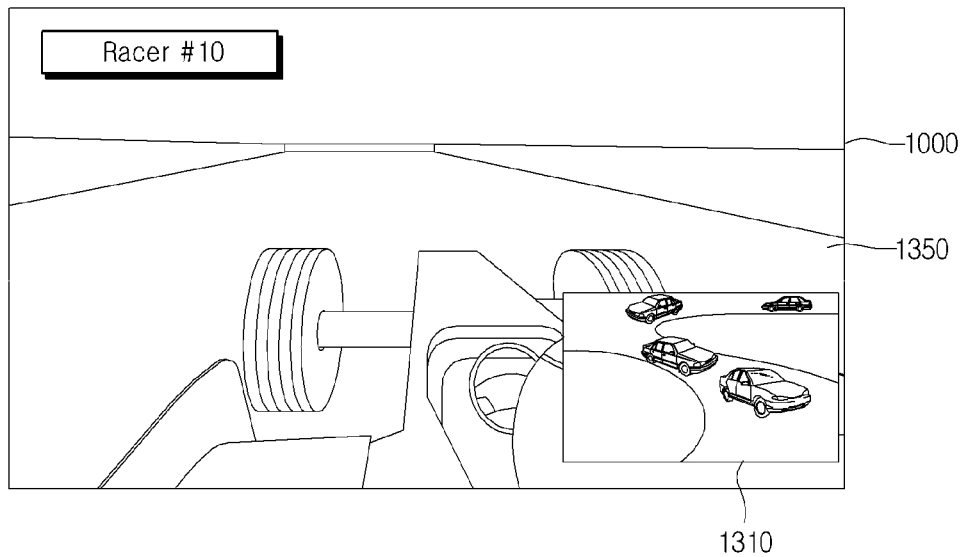

Referring to FIG. 43, when a user selects the first button 1320, the additional information window 1300 disappears; the multiview image 1350 is displayed on the entire screen 1000; and the image 1310 of the RT broadcast program is displayed on the multiview image 1350 in PIP.

When images displayed in PIP as shown in FIG. 41 or 43, one or both sound of the RT broadcast and sound of the multiview image may be outputted at a user's selection using a remote controller 890.

Figure 44:
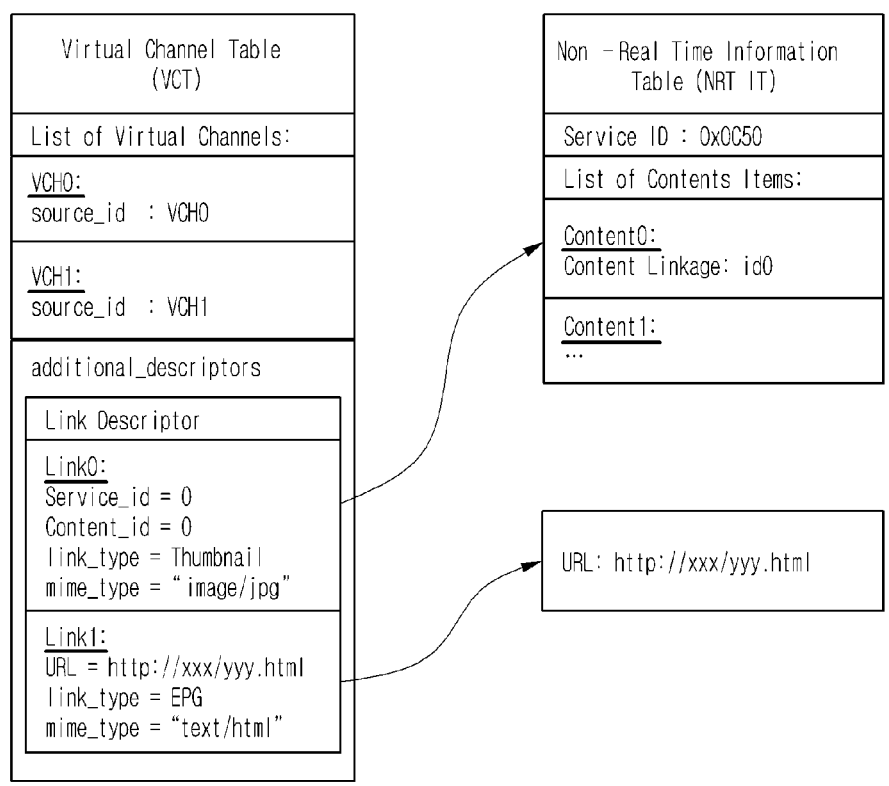
Figure 45:
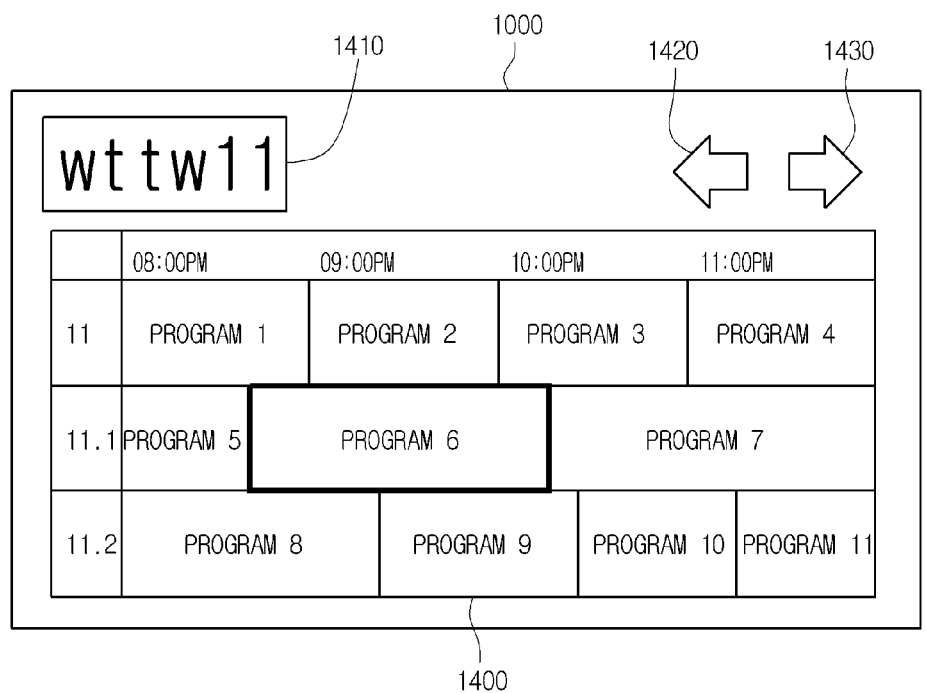

FIGS. 44 and 45 are views illustrating a method of displaying an EPG by using link information according to an embodiment when the EPG is displayed through NRT service or Internet service.

Referring to FIG. 44, there are two links for an EPG "Link0" and "Link1" in a Link Descriptor.

Additional information linked using "Link0" is provided through an NRT service having service_id of "0", and is a thumbnail image "jpg" file having content_id of "0".

Additionally, additional information linked using "Link1" is an EPG "html" file provided through an Internet service having a URL of "http://xxx/yyy.html".

Once it is confirmed that internet is connected and there is an EPG link "Link1" in an HTML format as shown in FIG. 44, an EPG may be displayed on a screen by using an HTML page corresponding to "Link1".

Referring to FIG. 45, a thumbnail image 1410 according to "Link0" is received through the NRT service, and then, is displayed on a screen 1000. The thumbnail image 1410 may be the log of a corresponding broadcaster.

Moreover, an EPG 1400 expressed using an HTML according to "Link1" may be displayed on an entire or portion of the screen 1000.

Additionally, if there is a link in the EPG 1400 for reading additional information on each program into another page, a specific program may be highlighted using direction keys in a remote controller 890, and a new HTML page may be provided according to a link representing additional information on the highlighted program.

In this case, a URL address of a previous page may be stored, and when a user selects a previous page button 1420, it may return to a previous screen by using the stored URL address.

Moreover, the next page button 1430 is activated when a user selects the previous page button 1420, and the page before a user selects the previous page button 1420 is displayed on the screen 1000 when a user selects the next page button 1430.

According to the method described with reference to FIGS. 44 and 45, EPG information is received through NRT service or Internet service without receiving an EIT, and then, is displayed on the screen 1000.

A broadcast signal receiving method according to an embodiment can be stored in a computer readable recording medium. Examples of the computer readable recording medium include read-only memory (ROM), random-access memory (RAM), CD-ROMs, magnetic tapes, floppy disks, and optical data storage devices.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:

1. A method of transmitting a broadcast signal, comprising:
generating a broadcast stream including at least one program, program table information representing the broadcast stream, and additional information on the broadcast stream;
constituting a stream including the broadcast stream and the program table information; and
transmitting the constituted stream and the generated additional information, respectively,
wherein the program table information comprises an Event Information Table (EIT) including information on a plurality of events and Non-Real-Time Information Table (NRT IT) including information on a content transmitted through Non-Real-Time (NRT) service,
wherein the information on a plurality of events includes name of the event,
wherein the EIT comprises link information for linking an event in the EIT to the additional information on the event,
wherein the link information comprises a link type field which represents types of the additional information which is linked to the event in the EIT,
wherein the link information comprises service id of the NRT service and content linkage identifying a content item, being transmitted through the NRT service, including the additional information, when the additional information is transmitted through the NRT service,
wherein the link information comprises information representing the numerical value of the one or more links for receiving the one or more associated contents and one or more links, wherein one or more pieces of link information corresponding to the one or more links, respectively,
wherein the service id matches an identifier for NRT service included in the NRT IT, and the content linkage matches a content linkage included in the NRT IT.

2. The method according to claim 1, wherein the constituted stream is transmitted using Real Time (RT) service, and the additional information is transmitted using at least one of Non-Real Time (NRT) service and Internet service.

3. The method according to claim 1, wherein the additional information comprises information on a channel or program in the broadcast stream.

4. The method according to claim 3, wherein the additional information comprises at least one of a picture and video related to the channel or program.

5. The method according to claim 1, wherein when the additional information is transmitted using Internet service, the link information comprises a Uniform Resource Locator (URL) corresponding to the additional information.

6. The method according to claim 1, wherein the link information comprises at least one of a transmission media, an expression type, and detailed information with respect to the additional information.

7. A method of receiving a broadcast signal, comprising:
extracting a broadcast stream including at least one program and program table information representing the broadcast stream, from the broadcast signal wherein the program table information comprises an Event Information Table (EIT) including information on a plurality of events, from the broadcast signal, wherein the information on a plurality of events includes name of an event in the EIT;
obtaining link information for linking the event in the EIT to an additional information on the event, from the EIT; and
receiving the additional information by using the obtained link information,
wherein the additional information is received using at least one of Non-Real-Time (NRT) service and Internet service,
wherein the link information comprises a link type field which represents types of the additional information which is linked to the event in the EIT,
wherein the link information comprises service id of the NRT service and content linkage identifying a content item, being transmitted through the NRT service, including the additional information, when the additional information is transmitted through the NRT service,
wherein the link information comprises information representing the numerical value of the one or more links for receiving the one or more associated contents and one or more links, wherein one or more pieces of link information correspond to the one or more links, respectively,
wherein the service id matches an identifier for NRT service included in a Non-Real-Time Information Table (NRT IT), and the content linkage matches a content linkage included in the NRT IT.

8. The method according to claim 7, wherein the Internet service has a higher priority than the NRT service, with respect to a path through which the additional information is received.

9. The method according to claim 7, wherein the receiving of the additional information comprises receiving the additional information through an access to Internet service by using a URL in the link information.

10. The method according to claim 7, wherein the link information comprises at least one of a transmission media, an expression type, and detailed information with respect to the additional information.

11. A device for receiving a broadcast signal, comprising:
a receiver for receiving the broadcast signal;
a demodulator for demodulating the received broadcast signal;
a demultiplexer for extracting a broadcast stream including at least one program and program table information representing the broadcast stream wherein the program table information comprises an Event Information Table (EIT) including information on a plurality of events, from the demodulated broadcast signal, wherein the information on a plurality of events includes name of an event in the EIT;
a controller for obtaining link information for linking the event in the EIT to an additional information on the event by using the extracted EIT; and
a network interface unit for receiving the additional information through an access to an Internet service corresponding to the obtained link information,
wherein the link information comprises a link type field which represents types of the additional information which is linked to the event in the EIT,
wherein the link information comprises service id of the Non-Real-Time (NRT) service and content linkage identifying a content item, being transmitted through the NRT service, including the additional information, when the additional information is transmitted through the NRT service, wherein the link information comprises information representing the numerical value of the one or more links for receiving the one or more associated contents and one or more links, wherein one or more pieces of link information correspond to the one or more links, respectively, wherein the service id matches an identifier for NRT service included in a Non-Real-Time Information Table (NRT IT), and the content linkage matches a content linkage included in the NRT IT.

12. The device according to claim 11, wherein the receiver receives the additional information by using an NRT service corresponding to the obtained link information; and the NRT service uses a File Delivery over Unidirectional Transport (FLUTE) method according to a Digital Storage Media-Command & Control (DSM-CC) protocol.

13. The device according to claim 11, wherein the link information comprises at least one of a transmission media, an expression type, and detailed information with respect to the additional information.

\* \* \* \* \*